(12) United States Patent
Balasubramanian et al.

(10) Patent No.: US 10,379,910 B2
(45) Date of Patent: Aug. 13, 2019

(54) SYSTEM AND METHOD FOR EVALUATION OF MIGRATION OF APPLICATIONS TO THE CLOUD

(71) Applicant: Syntel, Inc., Troy, MI (US)

(72) Inventors: Ashok Balasubramanian, Tamil Nadu (IN); Siddharth Jaiswar, Navi Mumbai MH (IN); Harish Wani, Navi Mumbai MH (IN)

(73) Assignee: Syntel, Inc., Troy, MI (US)

( * ) Notice: Subject to any disclaimer, the term of this patent is extended or adjusted under 35 U.S.C. 154(b) by 0 days.

(21) Appl. No.: 15/905,960

(22) Filed: Feb. 27, 2018

(65) Prior Publication Data

US 2018/0191599 A1 Jul. 5, 2018

Related U.S. Application Data

(63) Continuation-in-part of application No. 15/270,448, filed on Sep. 20, 2016, now abandoned, which is a
(Continued)

(51) Int. Cl.
*G06F 9/50* (2006.01)
*H04L 29/08* (2006.01)
(Continued)

(52) U.S. Cl.
CPC .............. *G06F 9/5072* (2013.01); *G06F 8/60* (2013.01); *H04L 43/50* (2013.01);
(Continued)

(58) Field of Classification Search
CPC ..... G06F 8/60; G06F 8/70; G06F 8/75; G06F 8/76; G06F 8/77; G06F 9/4806;
(Continued)

(56) References Cited

U.S. PATENT DOCUMENTS 6,557,008 B1 4/2003 Temple, III
7,379,996 B2 5/2008 Papatla et al.
(Continued)

OTHER PUBLICATIONS

Hwang et al., "Cloud Transformation Analytics Services: A Case Study of Cloud Fitness Validation for Server Migration", 2015 IEEE International Conference on Services Computing, 2015, pp. 387-394 (Year: 2015).*
(Continued)

*Primary Examiner* — Vivek Srivastava
*Assistant Examiner* — William C McBeth
(74) *Attorney, Agent, or Firm* — Miles & Stockbridge, P.C.; Ernest G. King

(57) ABSTRACT

The computer-implemented method for evaluation of migration of application to the cloud evaluates subject applications by executing an application discovery tool to capture application inventory data associated with the subject applications and to store the captured application inventory data. The method analyzes user-defined objectives for application cloud migration obtained via user interface and filters a set of predetermined Cloud Risk Probability (CRISP) categories based on user-defined objectives. The method determines a respective weightage to associate with each of the predetermined CRISP categories for each application. The method generates a CRISP score by applying the determined weightage of each of the set of predetermined CRISP categories in the application inventory data. The method determines respective application fitment scores for each application in the application inventory data based on the generated CRISP score and the historical application cloud migration data.

10 Claims, 21 Drawing Sheets

Related U.S. Application Data continuation of application No. 14/063,516, filed on Oct. 25, 2013, now abandoned.

(60) Provisional application No. 61/718,779, filed on Oct. 26, 2012.

(51) Int. Cl.
*H04L 12/26* (2006.01)
*G06F 8/60* (2018.01)
*H04L 29/06* (2006.01)
*H04L 12/24* (2006.01)

(52) U.S. Cl.
CPC .......... *H04L 63/1433* (2013.01); *H04L 67/10* (2013.01); *H04L 67/148* (2013.01); *H04L 67/16* (2013.01); *H04L 41/5019* (2013.01); *H04L 41/5096* (2013.01); *H04L 43/14* (2013.01)

(58) Field of Classification Search
CPC .... G06F 9/4856; G06F 9/5072; G06F 9/5077; G06F 9/5088; G06F 17/303; H04L 43/04; H04L 43/06; H04L 43/14; H04L 43/50; H04L 63/1433; H04L 67/10; H04L 67/148; H04L 67/16
See application file for complete search history.

(56) References Cited

U.S. PATENT DOCUMENTS

| | | | |
|---|---|---|---|
| 7,987,262 B2 | 7/2011 | Tung | |
| 8,010,460 B2 | 8/2011 | Work | |
| 8,234,156 B2 | 7/2012 | Comas | |
| 8,504,689 B2 | 8/2013 | Ferris | |
| 2002/0023257 A1 | 2/2002 | Charisius et al. | |
| 2005/0137918 A1 | 6/2005 | Joodi | |
| 2008/0243575 A1 | 10/2008 | Weinberger | |
| 2008/0255895 A1 | 10/2008 | Rajamony | |
| 2009/0288061 A1 | 11/2009 | Silvera | |
| 2009/0320019 A1 | 12/2009 | Ellington | |
| 2010/0023360 A1 | 1/2010 | Nadhan | |
| 2010/0125473 A1 | 5/2010 | Tung et al. | |
| 2010/0333116 A1 | 12/2010 | Prahlad et al. | |
| 2011/0107327 A1 | 5/2011 | Barkie et al. | |
| 2011/0126197 A1 | 5/2011 | Larsen et al. | |
| 2011/0270968 A1 | 11/2011 | Salsburg | |
| 2011/0276675 A1 | 11/2011 | Singh et al. | |
| 2011/0276684 A1 | 11/2011 | Singh et al. | |
| 2011/0295925 A1 | 12/2011 | Lieblich | |
| 2011/0295999 A1 | 12/2011 | Ferris et al. | |
| 2011/0302277 A1 | 12/2011 | Baker | |
| 2012/0054731 A1 | 3/2012 | Aravamudan | |
| 2012/0060142 A1 | 3/2012 | Fliess | |
| 2012/0102193 A1 | 4/2012 | Rathore | |
| 2012/0124081 A1 | 5/2012 | Ebrahimi et al. | |
| 2012/0131567 A1 | 5/2012 | Barros et al. | |
| 2012/0185913 A1 | 7/2012 | Martinez et al. | |
| 2012/0265726 A1 | 10/2012 | Padmanabhan et al. | |
| 2012/0304179 A1 | 11/2012 | Devarakonda | |
| 2013/0007216 A1 | 1/2013 | Fries et al. | |
| 2013/0061146 A1 | 3/2013 | Kirby | |
| 2013/0091285 A1 | 4/2013 | Devarakonda | |
| 2014/0012562 A1 | 1/2014 | Chang | |
| 2014/0068053 A1 | 3/2014 | Ravi | |
| 2014/0122577 A1 | 5/2014 | Balasubramanian | |
| 2014/0143011 A1 | 5/2014 | Mudugu | |
| 2014/0229607 A1* | 8/2014 | Jung | H04L 67/10 709/224 |
| 2014/0279201 A1 | 9/2014 | Iyoob | |
| 2015/0019195 A1* | 1/2015 | Davis | G06F 11/3442 703/17 |
| 2015/0341240 A1* | 11/2015 | Iyoob | G06F 8/60 709/201 |
| 2016/0094477 A1* | 3/2016 | Bai | G06F 9/5083 709/226 |
| 2016/0112510 A1* | 4/2016 | Bai | H04L 67/1095 709/217 |
| 2017/0373935 A1* | 12/2017 | Subramanian | G06F 9/5072 |

OTHER PUBLICATIONS

Stone et al., "Cloud Risk Decision Framework", Technical Report, Microsoft, 2015 (Year: 2015).*

Frey, et al., "Automatic Conformance Checking for Migrating Software Systems to Cloud Infrastructures and Platforms", Journal Soft Maint. Evol: Res. Prac. Wiley & Sons (Copyright 2011, p. 1-27).

Chauhan et al., "Towards Process Support for Migrating Applications to Cloud Computing", 2012 International Conference on Cloud and Service Computing, Nov. 22-24, 2012, pp. 80-87.

Illa et al., "Enterprise Cloud Migration: A Phase Driven Step-by-Step-Strategy intended for Scalability, Elasticity, Agility and Reliability", International Journal of Computer Application, vol. 2, No. 2, Apr. 2012, pp. 1-6.

Kaisler et al., "A Decision Framework for Cloud Computing", 2012 45th Hawaii International Conference on System Sciences, Jan. 4-7, 2012, pp. 1553-1562.

Kommalapati et al., "The SaaS Development Lifecycle", Infoq. com, 2011.

Rosenblum, "7 Quick Step Model of Migration Into the Cloud", CloudTweaks, Sep. 24, 2012.

Varia, "Migrating your Existing Applications to the AWS Cloud", Amazon Web Services, Oct. 2010.

Vu et al., "Legacy Application Migration to the Cloud", 2012 IEEE Eighth World Congress on Services, Jun. 24-29, 2012, pp. 270-277.

Beserra et al., "Cloudstep: A Step-by-Step Decision Process to Support Legacy Application Migration to the Cloud," 2012 IEEE International Workshop on Maintenance and Evolution of Service-Oriented and Cloud-Based Systems, Sep. 24, 2012, pp. 7-16.

"Burton Group Highlights Five Cloud Computing Adoption Steps for CIOs," Business Wire, Jul. 28, 2010.

"Creating a Roadmap to the Cloud," General Dynamics Information Technology, Aug. 2012.

"Hanu Software Launches Online Cloud Application Assessment Portal," Business Wire, Oct. 24, 2012.

"NCS Azure Cloud Consulting Services," NCS Pte. Ltd., 2010.

"Oracle Cloud Blueprint and Roadmap Service," Oracle, 2012.

"Oracle Consulting Cloud Services Framework," Oracle, 2010.

Peddigari, "Unified Cloud Migration Framework—using Factory based approach," 2011 Annual IEEE India Conference, Dec. 16-18, 2011, pp. 1-5.

"Planning the Migration of Enterprise Applications to the Cloud," Cisco, 2010.

Rashmi et al., "A five-phased approach for the cloud migration," International Journal of Emerging Technology and Advanced Engineering, vol. 2, No. 4, Apr. 2012, pp. 286-291.

Tran et al., "Size Estimation of Cloud Migration Projects with Cloud Migration Point (CMP)," 2011 International Symposium on Empirical Software Engineering and Measurement, Sep. 22-23, 2011, pp. 265-274.

"Ready for takeoff—Preparing for your journey into the cloud," Ernest & Young Insights on governance, risk and compliance, Apr. 2012.

Misra et al., "Identification of a company's suitability for the adoption of cloud computing and modelling its corresponding Return on Investment", Mathematical and Computer Modelling, vol. 53, No. 3-4, Feb. 2011, pp. 504-521.

Tan et al., "An Evaluation Framework for Migrating Application to the Cloud: Software as a Service", Proceedings of 2nd International Conference on Logistics, Informatics and Service Science, 2012, pp. 967-972.

Kundra, "Federal Cloud Computing Strategy", 2011.

* cited by examiner

| Customer | | | Customer name 🔍 |
|---|---|---|---|
| Customer Name | Details 1 | Details 2 | |
| Customer 1 | | | View |
| Customer 2 | | | View |

Customer Details name details 1 details 2

Add

Customer     Customer 1 Details

[Stake Holders] [Objectives/Strategy] [Scope/Deliverables] [App Inventory] [Server] [Network]

| | Stake Holder Name | Department | Contact Details |
|---|---|---|---|
| ☑ | | | |
| ☐ | | | |
| ☑ | | | |
| ☐ | | | |

Add     Delete

FIG. 7B

| Customer | Customer 1 Details |

- Stake Holders
- Objectives/Strategy
- Scope/Deliverables
- App Inventory
- Server
- Network

| | Objective/Strategy | Details |
|---|---|---|
| ☑ | | |
| ☐ | | |
| ☑ | | |
| ☐ | | |

[ Add ]   [ Delete ]

FIG. 7C

| Customer | Customer Name 🔍 |

- Stake Holders
- Objectives/Strategy
- Scope/Deliverables
- App Inventory
- Server
- App Inventory
- Network

Scope   ☑ Infrastructure Assessment    ☐ Application Assessment
Estimation ⦿ Yes ◯ No   Point of Concept ⦿ Yes ◯ No

Deliverables
- ☑ CRISP IaaS Score
- ☐ Infrastructure Reference Architecture
- ☐ CRISP PaaS Score
- ☐ Application/PaaS Reference Architecture
- ☐ Application Filment Score
- ☐ Application Adoption Roadmap
- ☐ Proof of Concept
  - ☐ Point of Arrival  ☐ Test Results  ☐ Key Success Criteria
  - ☐ Modified Code  ☐ Learnings

[ Clear ]   [ Save ]

FIG. 7D

| | App Name | Type | Description | |
|---|---|---|---|---|
| ☑ | | | | Detail |
| ☐ | | | | Detail |
| ☑ | | | | Detail |
| ☐ | | | | Detail |

Customer — Customer 1 Details

Tabs: Stake Holders | Objectives/Strategy | Scope/Deliverables | App Inventory | Server | Network

[ Add ]  [ Delete ]

FIG. 8A

Customer — Customer 1 Details

Customer 1 »App Inventory

Tabs: Application Generic Information | Infrastructure | Application Technology | Application Integration | Security | Business & App SLA | Architecture | Pain Points | Notes | Azure specific information Application Group Application Name Application Identifer Application Owner and SME Application Description Application Class Classification Application Environments
● DeV ○ Test ○ Prod Application Server Type
● Batch ○ Web based ○ Desktop Is Disaster Recovery (DR) in place?
● Yes ○ No Location of DR system Current Application Version Total Cost of ownership of the application Is the application using any 3rd party adapters/utilities Is High Level Design Document available?
● Yes ○ No Is Physical/Logical Architecture Diagram available?
● Yes ○ No Are Business process/Standard Ops related documents available?
● Yes ○ No Save >>

FIG. 8B

| Customer | Customer 1 Details |

Customer 1 »App Inventory

| Application Generic Information | Infrastructure | Application Technology | Application Integration | Security | Business & App SLA | Architecture | Pain Points | Notes | Azure specific information |

OS and Version

Application Server Platform & Version

Database Server Platform & Version

Application is Load Balanced using Either H/W
● H/W (F5 Loadbalancer) ○ S/W (Apache)

Numbers of cluster instances

Save >>

FIG. 8C

| Customer | | | | | | Customer 1 Details |
|---|---|---|---|---|---|---|
| Stake Holders | Objectives/ Strategy | Scope/ Deliverables | App Inventory | Server | Network | |

| | Server Name | Configuration | OS/ Version | Type | Description |
|---|---|---|---|---|---|
| ☑ | | | | | |
| ☐ | | | | | |
| ☑ | | | | | |
| ☐ | | | | | |

[ Add ]  [ Delete ]

FIG. 8D

| Customer | | | | | | Customer 1 Details |
|---|---|---|---|---|---|---|
| Stake Holders | Objectives/ Strategy | Scope/ Deliverables | App Inventory | Server | Network | |

| | Subnet | IP Range | Group | Type | Description |
|---|---|---|---|---|---|
| ☑ | | | | | |
| ☐ | | | | | |
| ☑ | | | | | |
| ☐ | | | | | |

[ Add ]  [ Delete ]

FIG. 8E

| Legend | 1 | 2 | 3 | 4 | 5 | |
|---|---|---|---|---|---|---|
| | | | | | | |

| # | Decision Categories | Weightage | CRISP Score | | | | Considerations |
|---|---|---|---|---|---|---|---|
| | | | Cloud | Private | Public | Hybrid | |
| 3 | Global Access | 2% | 3 | 4 | 2 | 3.5 | -Majority is internal and enterprise grade<br>-Less than 5% applications are part of the online customer portal for retail business |
| 4 | Existing Investments in Infra/Software | 10% | 5 | 4 | 4.5 | 5 | -For all decommissioned servers or servers that are nearing the decommissioning period (13%), no investments are to be retained. For all whose shelf life is greater than next 5 years, retain the server investments |
| 5 | Availability | 10% | 5 | 4 | 5 | 4 | -64% of the applications are either mission or business critical<br>-30% of those required less than 1 hour of service downtime per week |
| 6 | Infrastructure Utilization | 10% | 3 | 3 | 3 | 3 | -Adequate use of virtualization and utilization<br>-Majority of package solutions (64%) limit the control on utilization |
| 7 | Cost | 30% | 5 | 4 | 4.5 | 5 | -Only 13% of the current infrastructure can be used past 5 years<br>-For all the remaining need is to move from a learned model to |
| 8 | Business Trend | 0% | 5 | 4 | 2 | 4.5 | -No trend of industry embarking on cloud, or need for measuring competition |
| 9 | Data Storage Security | 5% | 5 | 5 | 0 | 1 | -No moving data outside of the network<br>-Data stored in encrypted and current security measures are sufficient |
| 10 | Relational Databases | 10% | 5 | 5 | 1 | 1 | -Nearly 90% of applications use are relational datastore with 40% Oracle, 35%Db2 and 15%SQL Server |
| 11 | Authentication | 5% | 5 | 5 | 1 | 1 | -Single Sign On solution is TAM for all applications<br>-Federation is not enabled |
| 12 | Regulatory Compliance | 10% | 4 | 5 | 1 | 1 | -SOX compliance governs the data to stay within the country<br>-Internal organization data classification warrants not |
| 13 | Legacy/Has Cloud Confinement | 2% | 2 | 2 | 2 | 2 | -60% of applications are packaged software as that will be difficult to cloud across merchandising and financial applications |
| 14 | Non-Mission Critical | 2% | 4 | 3 | 3.5 | 4 | -36% is non-mission critical apps and can be moved to cloud |
| | CRISP Score on Weightage | 100% | 4.50 | 4.10 | 3.12 | 2.69 | |

FIG. 13

| # | Decision Categories | Weightage | CRISP - PAAS PAAS (Tes/Mlm) | Considerations |
|---|---|---|---|---|
| 1 | Systems Architecture | 30% | 4 | - 40% of applications are custom built, and all of them are on WebLogic |
| 2 | Application Refactoring | 10% | 3 | - Application refactoring can be considered as long as it is limited and does not affect a larger perimeter |
| 3 | Reliability | 10% | 5 | - For Mission critical applications, reliability is required |
| 4 | Scalability | 20% | 4 | - Highly desireed to have scalability at service level as that would minimize infrastructure wastage |
| 5 | High computing | 10% | 3 | - There are a few high computing applications |
| 6 | Technology Standardization | 20% | 5 | - Technology standarization is desired |
| 6 | Middleware | 0% | 5 | - No Middleware technologies used across applications |
|  | CRISP Score on Weightage | 100% | 4.10 |  |

FIG. 14

SYSTEM AND METHOD FOR EVALUATION OF MIGRATION OF APPLICATIONS TO THE CLOUD

CROSS-REFERENCE TO RELATED APPLICATIONS

This application is a continuation-in-part of U.S. application Ser. No. 15/270,448, filed 20 Sep. 2016 (the '448 application), now pending, which is a continuation of U.S. application Ser. No. 14/063,516, filed 25 Oct. 2013 (the '516 application), now abandoned, which claims the benefit of U.S. provisional application No. 61/718,779, filed 26 Oct. 2012 (the '779 application). The '448 application, the '516 application, and the '779 application are all hereby incorporated by reference as though fully set forth herein.

BACKGROUND a. Technical Field

The present disclosure relates generally to computerized systems and methods, and in particular, to a computerized system and method for evaluating readiness of applications for migration to the cloud.

b. Background Art

This background description is set forth below for the purpose of providing context only. Therefore, any aspects of this background description, to the extent that it does not otherwise qualify as prior art, is neither expressly nor impliedly admitted as prior art against the instant disclosure.

In general, "cloud computing" refers to technologies that provide computation, software, data access, and/or storage services that do not require end-use-knowledge of the physical location and configuration of the system that delivers the services. Many organizations are transitioning locally installed or accessible software and/or platforms to the cloud, which provides a service delivery model that often brings cost benefits and flexibility.

For those organizations that would want to move from a conventional computing environment to a cloud computing environment, an evaluation process must be undertaken to identify the kind of cloud computing environment suitable to them and creation of a roadmap for moving to that target cloud environment. This involves creation of the most appropriate cloud platform and application architecture. It also involves prioritization of applications to be migrated to this cloud platform and architecture.

The foregoing discussion is intended only to illustrate the present field and should not be taken as a disavowal of claim scope.

SUMMARY

In an embodiment, a computer-implemented method for the evaluation of a plurality of subject applications for migration to the cloud may include the steps of executing, on at least one or more computers being used by the applications, a cloud migration application discovery tool, wherein the cloud migration application discovery tool may be configured by way of a first program to capture application inventory data associated with said plurality of subject applications and to store the captured application inventory data in an assessment database, analyzing, on a separate computer not used by the applications, a plurality of user-defined objectives for application cloud migration obtained via a user interface and filtering a set of predetermined Cloud Risk Probability (CRISP) categories based on the user-defined objectives, determining, via a scoring engine, on the separate computer, a respective weightage to associate with each one of the set of predetermined CRISP categories to be assessed for migration to the cloud, generating a CRISP score for the entire organization based on the summary of the assessment data and the objectives of the organization by applying the determined weightage of each of the set of predetermined CRISP categories included in the application inventory data. The CRISP score may then be used to calculate an application fitment score (AFS).

In an embodiment, the computer-implemented method for the evaluation of a plurality of subject applications for migration to the cloud may include defining, on the separate computer, at least one rule for a cloud code analysis tool (CCAT) based on the plurality of user-defined objectives for application cloud migration and executing, on the separate computer, the CCAT to determine any non-conformities to cloud migration for each application based on the at least one rule.

In an embodiment, the computer-implemented method for the evaluation of a plurality of subject applications for migration to the cloud may include executing the CCAT to determine the time required to resolve the non-conformities to cloud migration for each application based on the at least one rule.

In an embodiment, the computer-implemented method for the evaluation of a plurality of subject applications for migration to the cloud may include executing the CCAT to correct the non-conformities to cloud migration for each application based on the at least one rule.

In an embodiment, the computer-implemented method for the evaluation of a plurality of subject applications for migration to the cloud may include providing an effort estimation for cloud migration based at least in part on the results of the CCAT scan.

In an embodiment, the computer-implemented method for the evaluation of a plurality of subject applications for migration to the cloud may include receiving non-functional requirements for the applications based on the application inventory data and/or any additional applications for cloud migration via the user interface.

In an embodiment, the computer-implemented method for the evaluation of a plurality of subject applications for migration to the cloud may include the second program capturing any commercial-off-the-shelf (COTS) applications not discovered by the first program.

In an embodiment, the computer-implemented method for the evaluation of a plurality of subject applications for migration to the cloud may include the second program storing the captured COTS applications in the assessment database.

In an embodiment, the computer-implemented method for the evaluation of a plurality of subject applications for migration to the cloud may include receiving at least one cloud reference architecture based at least upon the plurality of user-defined objectives for application cloud migration and/or the set of predetermined CRISP categories.

In an embodiment, the computer-implemented method for the evaluation of a plurality of subject applications for migration to the cloud may include receiving key success criteria (KSC) based at least upon the plurality of user-defined objectives for application cloud migration and/or the set of predetermined CRISP categories.

In an embodiment, the computer-implemented method for the evaluation of a plurality of subject applications for migration to the cloud may include the second program determining the current operating environment of the applications.

In an embodiment, the computer-implemented method may comprise computer instructions (i.e., software), which when executed by the processor, is configured to perform the methods and functions set forth herein.

The foregoing and other aspects, features, details, utilities, and advantages of the present disclosure will be apparent from reading the following description and claims, and from reviewing the accompanying drawings.

BRIEF DESCRIPTION OF THE DRAWINGS

FIGS. 7A-7D are graphical user interfaces generally illustrating a customer details interface, a stakeholder details interface, an objective/strategy interface, and a scope/deliverables interface, respectively, produced by an embodiment of MACH in accordance with teachings of the present disclosure.

FIGS. 8A-8E are graphical user interfaces generally illustrating a customer application inventory interface, an application generic information interface, an infrastructure information interface, a customer server information interface, and customer network information interface, respectively, produced by an embodiment of MACH in accordance with teachings of the present disclosure.

FIG. 13 is a table generally illustrating a Cloud Risk Probability (CRISP) scoring table generated by an embodiment of MACH in accordance with teachings of the present disclosure.

FIG. 14 is a table generally illustrating a CRISP platform-as-a-service (PaaS) scoring table generated by an embodiment of MACH in accordance with teachings of the present disclosure.

DETAILED DESCRIPTION

The system and methodology of applications to be cloud hosted (MACH) tool, hereinafter the MACH system 10, or simply system 10, enables the evaluation and assessment of the readiness of enterprise (i.e., business), applications to be cloud hosted. The methodology includes a set of processes and list of outputs (and the system includes the components) that will provide the enterprise with a clear approach of the requirements and/or constraints to migrate enterprise applications to the cloud.

Migration to the cloud has a number of advantages. For example, migration to the cloud improves enterprise flexibility. By migrating some or all applications to the cloud, an enterprise that is growing and/or with fluctuating bandwidth demands can realize improved performance and flexibility.

Migration to the cloud improves disaster recovery (DR). By migrating some or all applications to the cloud, an enterprise that faces a disaster (i.e., data loss), can use cloud migration to save time, reduce recovery costs, and restore the enterprise more quickly.

Migration to the cloud improves application updating (i.e., software updates), By migrating some or all applications to the cloud, the migrated applications can be updated automatically by the application vendors, improving performance of the enterprise and saving enterprise resources that would otherwise be involved in application updating.

Migration to the cloud improves document control. By migrating some or all applications to the cloud, documents are centrally located in the cloud, reducing dependency on the enterprise resources and improving efficiency and response time to access.

The system 10 includes a plurality of tools (i.e., modules), and a portal (i.e., graphical user interfaces (GUIs)), to perform the evaluation and assessment of enterprise applications. The modules and portals of the system 10 facilitate an efficient evaluation and assessment of enterprise applications, providing the enterprise with a clear understanding of the implications of cloud migration.

The system 10 can be used for the following enterprise activities: portfolio assessment, topology recommendations, reference architectures, application migration assessments, migration strategy and roadmap, and migration effort estimation.

Figure 1:
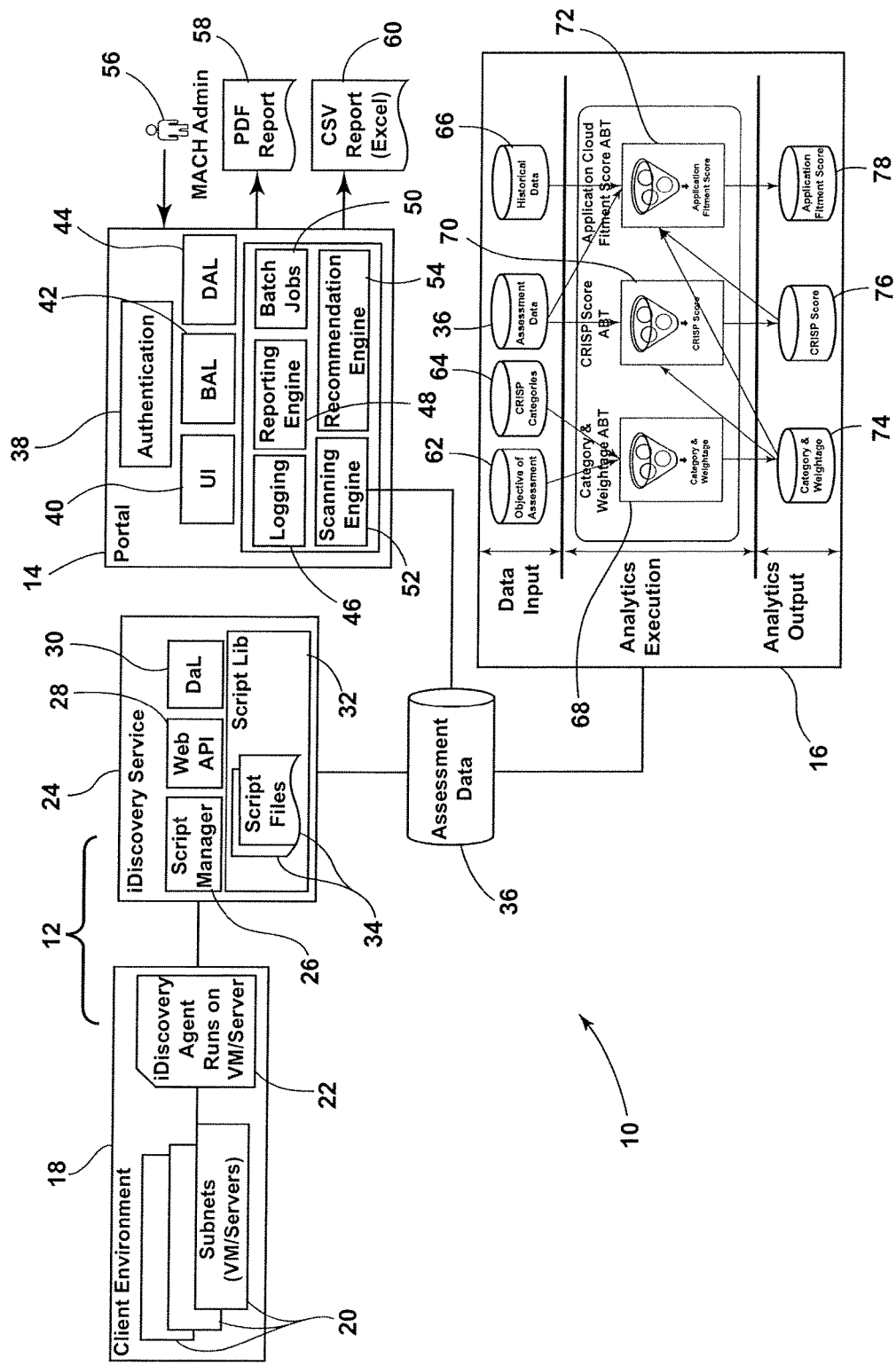
FIG. 1 is a block diagram generally illustrating an embodiment of a methodology of applications to be cloud hosted (MACH) with an iDiscover tool, MACH portal, and MACH scoring engine in accordance with teachings of the present disclosure.

In the illustrated embodiment, FIG. 1 is simplified diagram showing, in greater detail, the tools of the system 10. The system 10 includes an iDiscover tool 12, a MACH portal 14, and a scoring engine 16.

The iDiscover tool 12 may include a client environment 18, which may include a plurality of subnets 20 (i.e., virtual machine/servers). On each subnet 20, software including iDiscover agent 22 may be installed and operating. In embodiments, the iDiscover agent 22 is installed and operating on each server to discover the operating details of each server. Each instance of iDiscover agent 22 observes (i.e., monitors), the applications running (and other relevant information) within each subnet 20, including subnet and IP (Internet Protocol (address)) range information. The iDiscover agent 22 will be discussed in further detail below. In embodiments, the iDiscover service 24 is a software tool that may be installed on a separate subnet (i.e., virtual machine/server), 20. The iDiscover service 24 includes script manager 26, web application programming interface (API) 28, data access layer (DAL) 30, and script library 32 containing a plurality of script files 34. The iDiscover service 24 is also connected to MACH assessment database 36.

The MACH portal 14 may include an authentication module 38, a user interface (UI) 40, a business access layer (BAL) 42, a data access layer (DAL) 44, a logging module 46, a reporting engine 48, a batch jobs module 50, a scanning engine 52 that may be configured to access MACH assessment database 36, and a recommendation engine 54. The MACH portal 14 may be accessed by an administrator 56, using at least the authentication module 38 and the UI 40. The MACH portal 14 may generate, using recommendation engine 54, a .pdf (portable document format) report 58 and/or a .csv (comma-separated values) report 60.

The scoring engine 16 may include assessment objective data 62, a CRISP (Cloud Risk Probability) category data 64, MACH assessment data 36, and historical (i.e., enterprise, client), data 66. The scoring engine 16 may access assessment objective data 62, a CRISP category data 64, MACH assessment data 36, and historical data 66 and develop a category and weightage analytical base table (ABT) 68, a CRISP score ABT 70, and an application cloud fitment score ABT 72. The output of scoring engine 16 may include category and weightage data 74, CRISP score data 76, and application fitment score (AFS) data 78.

Figure 2:
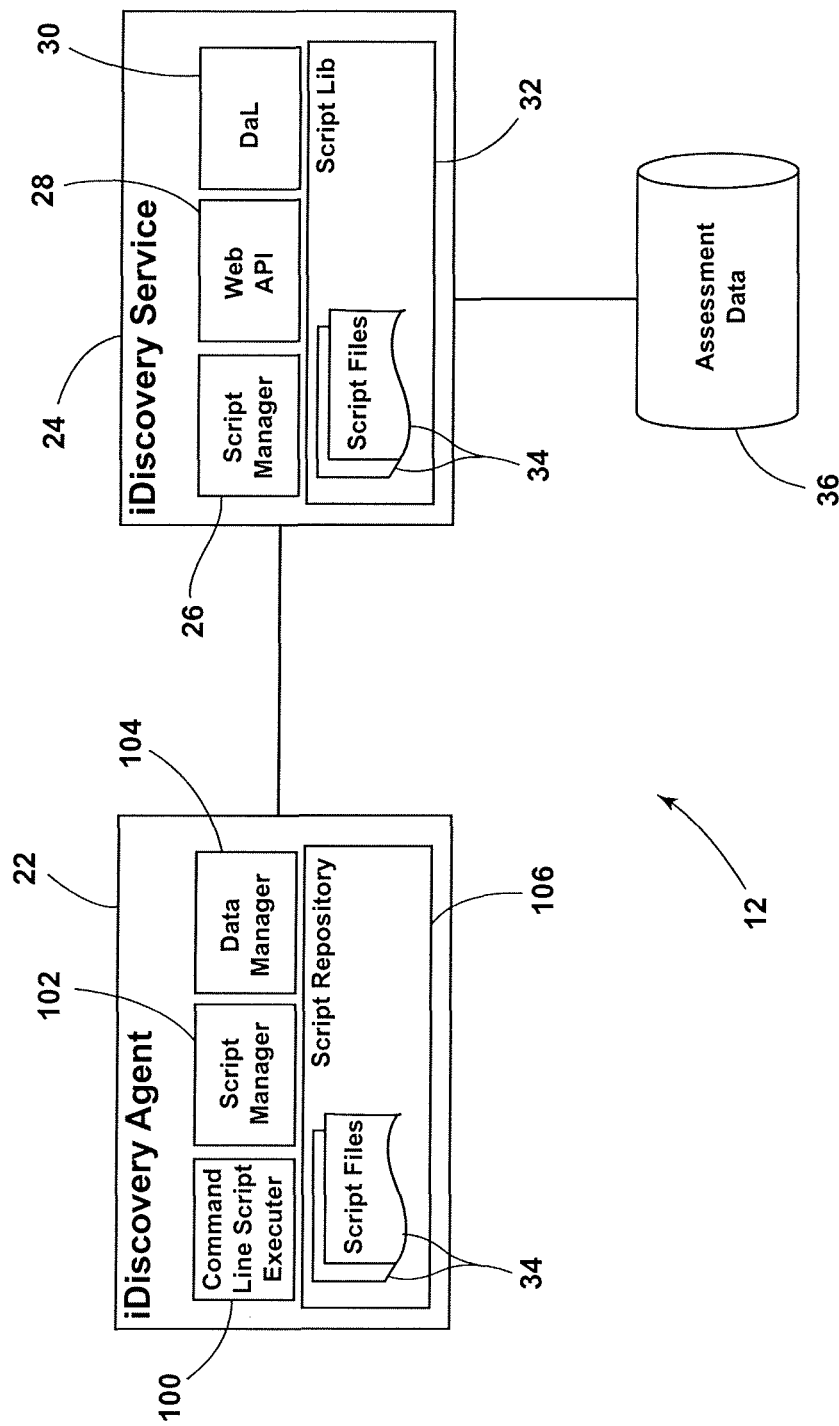
FIG. 2 is block diagram generally illustrating an embodiment of an iDiscover module with an iDiscover agent module and an iDiscover service module in accordance with teachings of the present disclosure.

An embodiment of the iDiscover tool 12 is illustrated in FIG. 2. The iDiscover tool 12 includes an iDiscover agent 22 and an iDiscover service 24.

The iDiscover agent 22 is a component (module) that resides on server(s) 20 in client environment 18 (as shown in FIG. 1) and captures information by executing one or more scripts 34. The captured information is passed to the iDiscover service 24 via web application program interfaces (APIs) 28. The iDiscover agent 22 includes a command line script executor 100 that executes the scripts 34 from the script repository 106 and passes the data to the data manager 104 for further processing. The iDiscover agent 22 includes a script manager 102 that manages the script repository 106. In the event a requested script 34 is not available, the script manager 102 sends a request to IDiscover service 24 and upon receiving the script 34 from iDiscover service 24, stores the script 34 in the script repository 106. The iDiscover agent 22 includes a data manager 104 that processes requests related to data and sends the captured data to iDiscover service 24. The iDiscover agent 22 script repository 106 also maintains script 34 details.

The iDiscover service 24 is a component of the iDiscover tool 12. The iDiscover service 24 includes a script manager 26 that manages a script library 32 and provides the required script 34 as needed to iDiscover agent 22. The script manager 26 also stores and retrieves scripts 34 from the script library 32 using web APIs 28. The script library 32 is also a repository for scripts 34. The web APIs 28 also interface between iDiscover service 24 and iDiscover agent 22.

Figure 3:
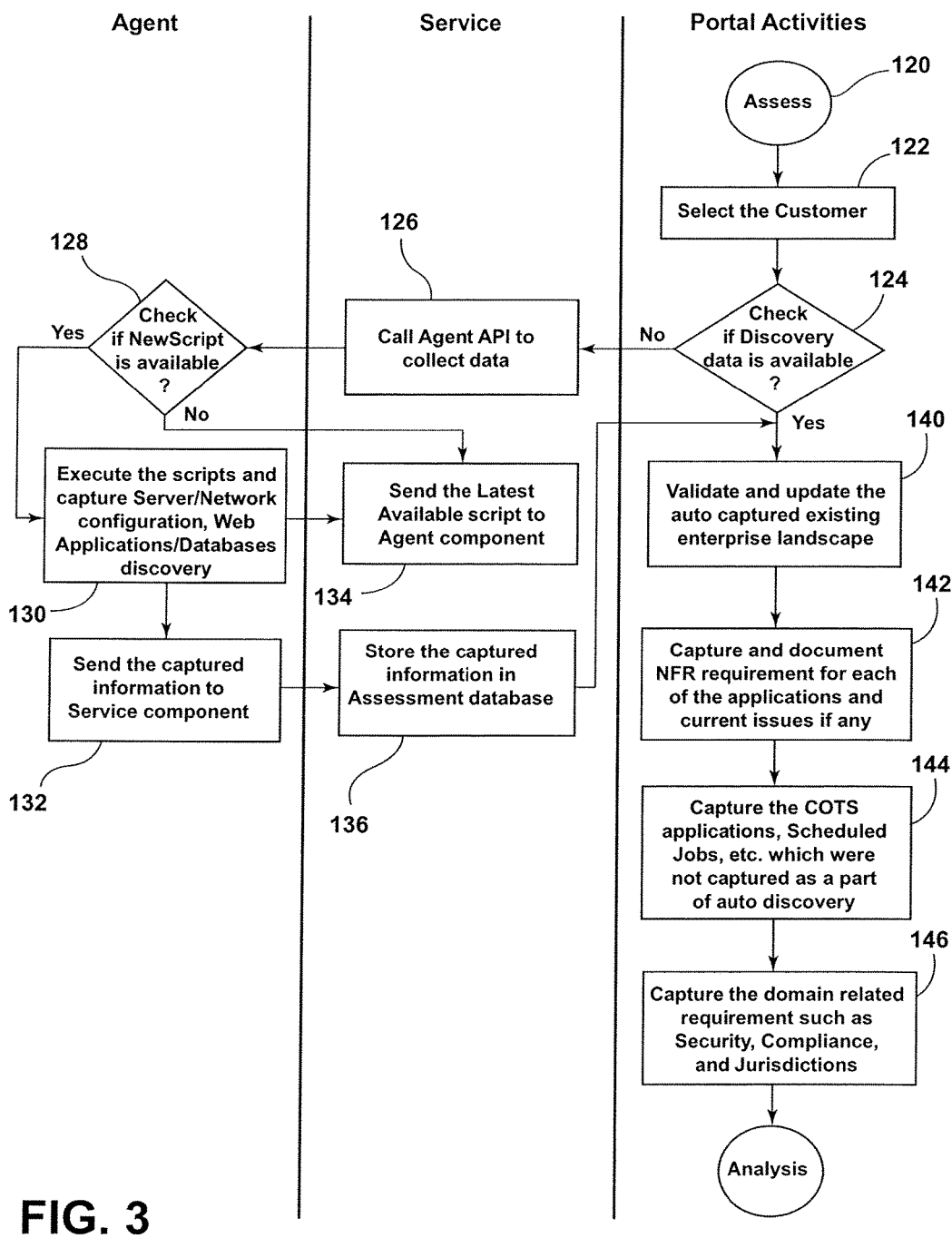
FIG. 3 is flow diagram generally illustrating an embodiment of the operation of an iDiscover tool in accordance with teachings of the present disclosure.

FIG. 3 illustrates a flow chart of the logical flow of an embodiment of the iDiscover tool 12 of the system 10. The first step in the iDiscover tool 12 process flow is a MACH portal 14 activity, step 120, launching the assessment phase via MACH portal 14. The next step in the iDiscover tool 12 process flow is also a MACH portal 14 activity, step 122, selecting the customer (i.e., enterprise), via the MACH portal 14. The next step is 124, checking to see if discovery data is available (from an earlier execution of the iDiscover tool 12).

If previous iDiscover tool discovery data is not available, the iDiscover tool 12 process flow proceeds to step 126, performed by the iDiscover service 24 of the iDiscover tool 12, calling the iDiscover agent 22 via web APIs 28 to collect discovery data. The iDiscover agent 22 determines if a new script(s) 34 is available in step 128.

If iDiscover agent 22 determines that new script(s) 34 is available, in step 128, the iDiscover agent 22 executes the script(s) 34 and captures server and/or network configuration and discovers web applications and/or databases in step 130. The iDiscover agent 22 sends the captured information to the iDiscover service 24 in step 132. If iDiscover agent 22 determines that new script(s) 34 is not available, in step 128, the iDiscover service 24 sends the latest available script(s) 34 to the iDiscover agent in step 134. The iDiscover service 24 stores the captured information in the MACH assessment database 36 in step 136.

If previous iDiscover tool discovery data is available, the MACH portal 14 validates and updates the automatically captured existing (current) enterprise landscape in step 140. In step 142, the MACH portal 14 captures and/or documents non-functional requirements (NFRs) for each of the applications in the scope of work and current issues, if any. In step 144, the MACH portal 14 captures any commercial-off-the-shelf (COTS) applications to be migrated, scheduled jobs, etc. which were not part of the automatic discovery via iDiscover tool 12. In step 146, the MACH portal 14 captures domain-related requirements, such as security requirements, compliance requirements, and jurisdictional requirements and the process moves to the analyze phase of the system 10.

Figure 4:
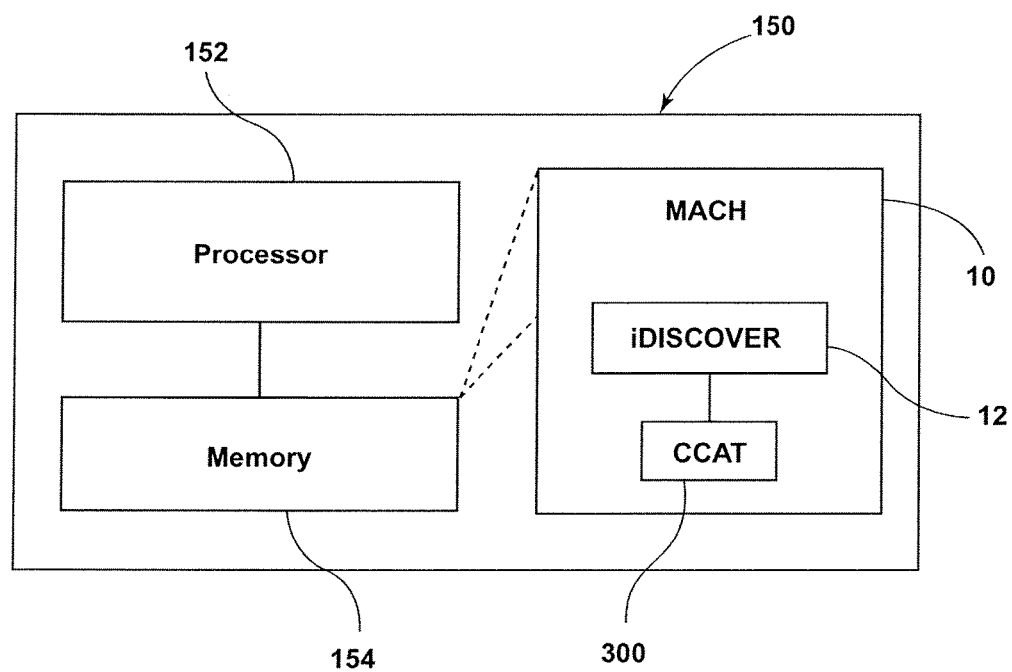
FIG. 4 is block diagram generally illustrating an embodiment of a MACH with an iDiscover tool and a cloud code analysis tool (CCAT) tool in accordance with teachings of the present disclosure.
Figure 16:
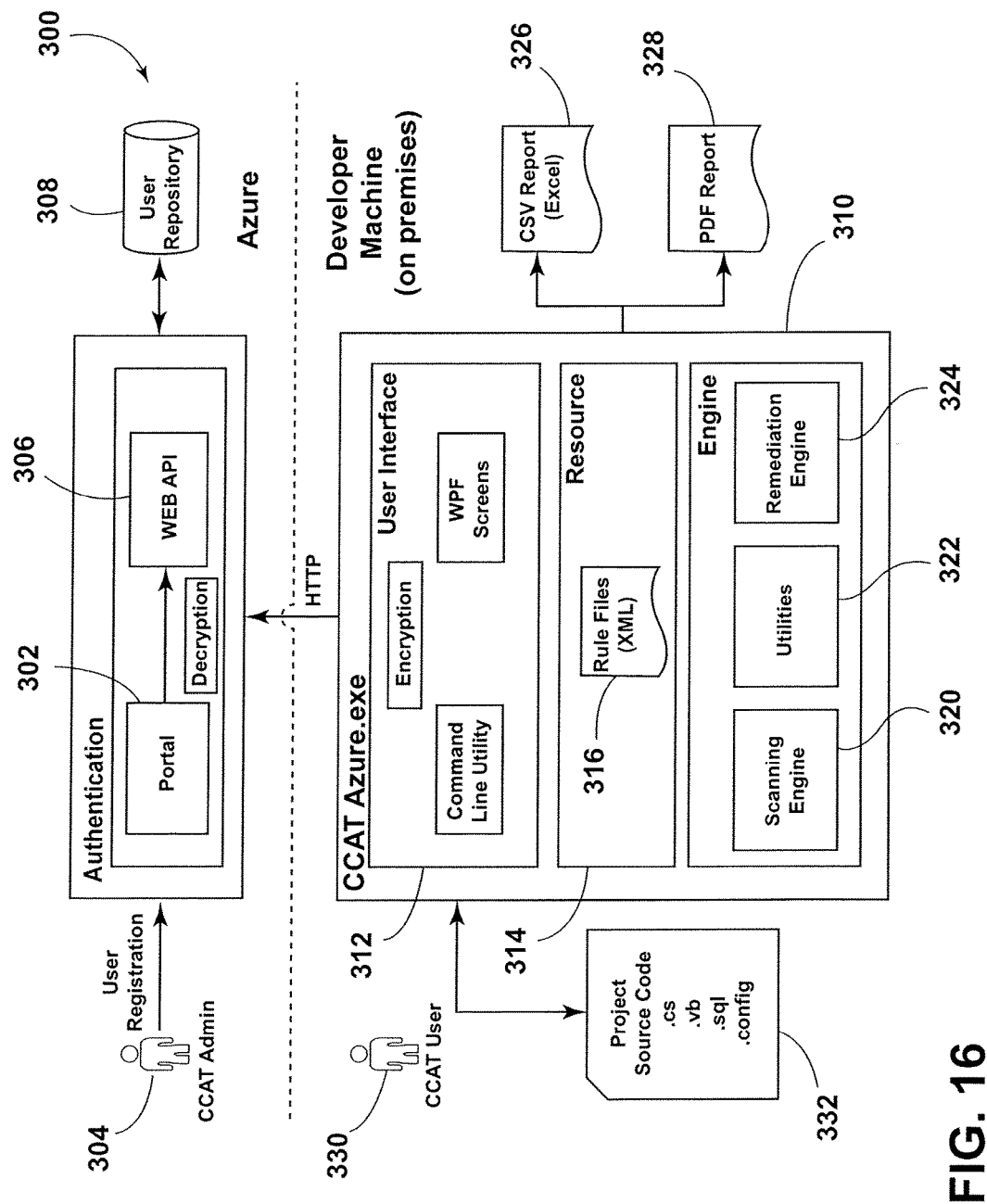
FIG. 16 is a block diagram generally illustrating an embodiment of a MACH CCAT tool in accordance with teachings of the present disclosure.

FIG. 4 is a simplified block diagram of a computer implemented system 150, in an embodiment, for evaluation and assessment of application migration to the cloud (i.e., the system 10). In the illustrated embodiment, system 150 may include one or more electronic processors 152, a memory 154, a variety of input/output mechanisms (not shown), such as a display, a microphone, a speaker, and a network interface (wired or wireless) the system 150 includes, for example stored in memory 154, a module 10 representing the MACH system 10, including an iDiscover tool (i.e., module) 12 and a CCAT tool 300 (as shown in FIG. 16), contains processor instructions defining code which when executed by processor 152 are configured generally to facilitate the analysis of programs/applications as well as other functions described herein.

Processor 152 is configured generally to control the overall operation of system 150, including coordination and cooperation among and between the other components of system 150. In an embodiment, processor 152 is configured to execute a suitable operating system. Processor 152 may include a central processing unit (CPU), memory (in addition to or such as the illustrated memory 154), and an input/output (I/O) interface through which processor 152 may receive a plurality of input signals and to generate a plurality of output signals.

Memory 154 is provided for storage of data and instructions or code (i.e., the above-mentioned code or software), for processor 152. Memory 154 may include various forms of non-volatile (i.e., non-transitory), memory including flash memory or read only memory (ROM), including various forms of programmable read only memory (e.g., PROM, EPROM, EEPROM), and/or volatile memory including random access memory (RAM), including static random access memory (SRAM), dynamic random access memory (DRAM), and synchronous dynamic random access memory (SDRAM). Although illustrated as a separate component in the illustrated embodiment, it should be understood that memory 154 may be internal to processor 152.

Figure 5:
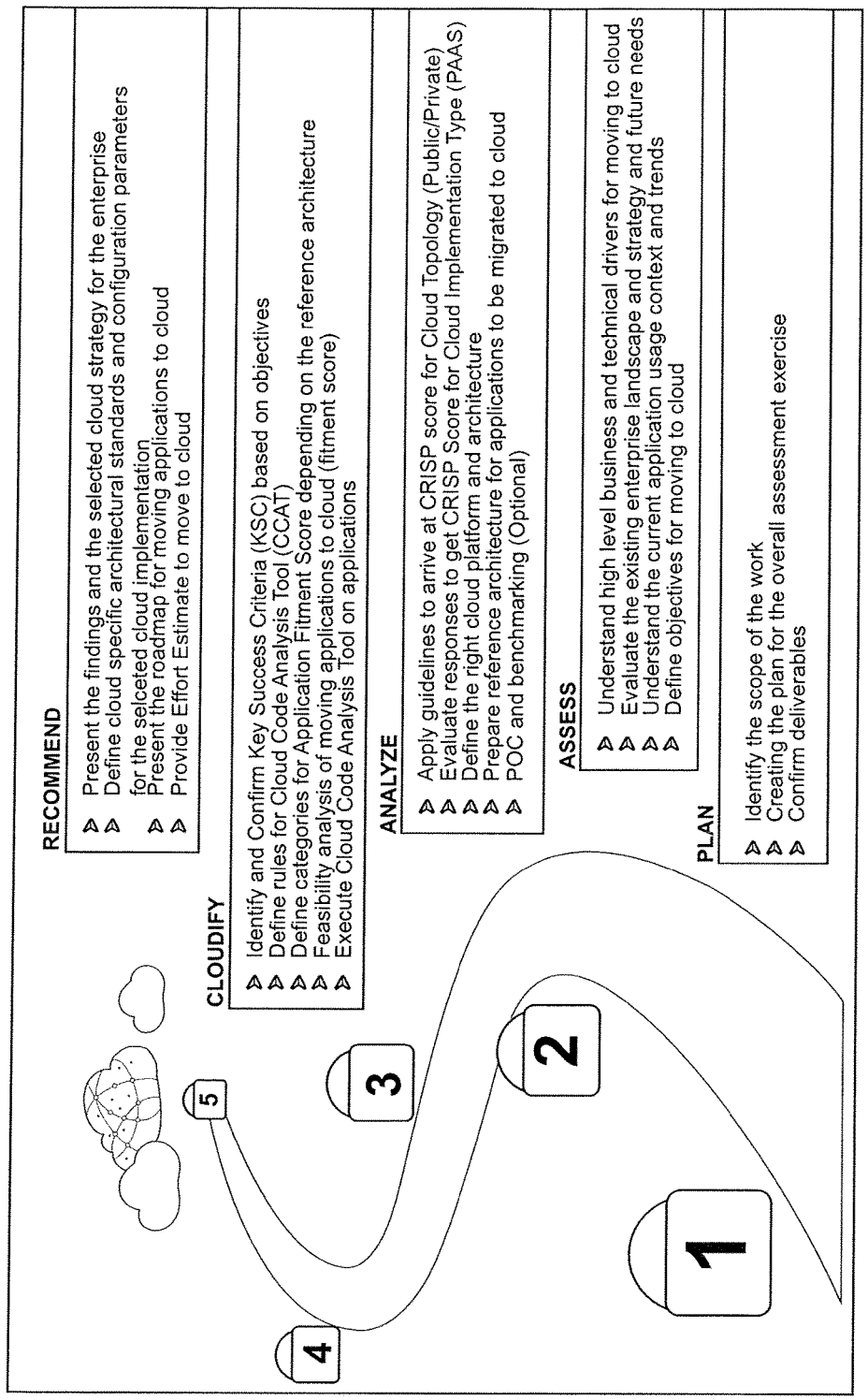
FIG. 5 is flow diagram generally illustrating an embodiment of a MACH with a plan phase, an assess phase, an analyze phase, a cloudify phase, and a recommend phase in accordance with teachings of the present disclosure.

The system 10 in operation may be considered as divided into a series of steps or phases, with each phase progressing in the system 10 assessment process. The phases of the operation of the system 10 may include a planning phase, an assessment phase, an analysis phase, a "cloudify" phase, and a recommendation phase. In the illustrated embodiment, FIG. 5 is a simplified diagram showing the phases of the operation of the system 10. Each phase of the system 10 will be described in further detail below.

Planning Phase.

The planning phase is the first, starting phase in methodology of the system 10. The planning phase includes an assessment of the scope of work (i.e., the scale of the enterprise application migration), and the planning of activities that may be required to complete the assessment. The planning phase includes documenting the scope of work and scheduling of the assessment of the applications that are to be evaluated for migration to the cloud.

The planning phase includes the following steps. Key stakeholders may be identified within the enterprise for discussions and workshops. Meetings may be scheduled in the planning phase to coordinate contributions of the key stakeholders regarding the objectives of the enterprise and applications may also be scheduled (i.e., reserved).

Figure 6:
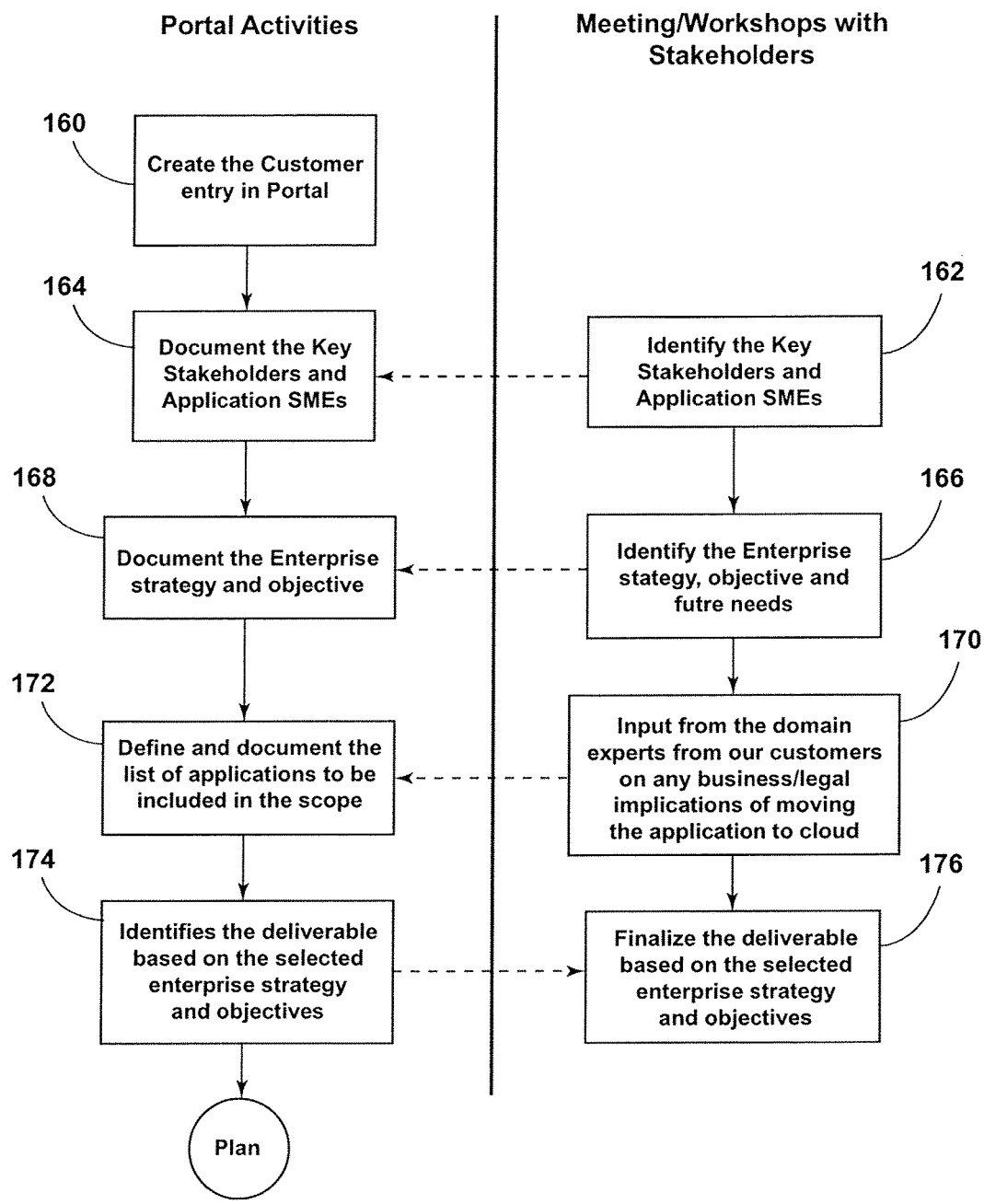
FIG. 6 is flow diagram generally illustrating an embodiment of a plan phase of a MACH in accordance with teachings of the present disclosure.

FIG. 6 illustrates a flow chart of the flow of steps in the planning phase of the system 10. The planning phase includes two categories: portal activities and meetings/workshops with key stakeholders.

The first step in the planning phase is a MACH portal 14 activity, step 160, creating an enterprise (i.e., customer), entry in the MACH portal 14. The MACH portal 14 receives customer information as inputs via a UI (i.e., user interface), such as, but not limited to, applications to be migrated, database information, etc. An example customer interface screen is shown in FIG. 7A.

The next step in the planning phase, step 162, is a meeting/workshop activity. Meetings and/or workshops involving the enterprise are conducted to identify key stakeholders and/or application subject matter experts (SMEs). The identities of the key stake holders and/or SMEs are collected for the next step in the planning phase, step 164.

In planning step 164, the identities of the key stakeholders and/or SMEs are received via the MACH portal 14 using a stakeholder information capture screen as shown in FIG. 7B. The next step in the planning phase is step 166.

In planning step 166, another meeting/workshop activity, meetings and/or workshops are conducted to identify the enterprise strategy, objectives, and future needs. The enterprise strategy may include the scope of work (i.e., the volume of applications to be migrated). The objectives may include timing, resource allocation, network bandwidth and/or cost. Future needs may include enterprise business goals such as expansion and/or diversification. The next step in the planning phase is step 168.

In planning step 168, a MACH portal 14 activity, the information collected concerning the enterprise strategy, objectives, and future needs is received via the MACH portal 14 using an assessment objective capturing screen as shown in FIG. 7C. The next step in the planning phase is step 170.

In step 170, meetings and/or workshops are conducted to collect input from enterprise domain experts regarding any business/legal implications of migrating the application to the cloud. The next step in the planning phase is step 172.

In step 172, a MACH portal 14 activity, defines and documents the list of applications to be included in the scope of work. The next step in the planning phase is step 174.

In step 174, a MACH portal activity, identifies the deliverables based on the selected enterprise strategy, objectives, and future needs. The next step in the planning phase is step 176.

In step 176, meetings and/or workshops are conducted to review the deliverables identified, and those deliverables are finalized and received via the scope of work/objective deliverables assessment screen, as shown in FIG. 7D, based on the selected enterprise strategy, objectives, and future plans.

Additionally and more specifically, the planning phase may include the following activities: identification of the scope of the work and creating the plan for the overall assessment exercise. Each will be described in more detail below.

Identification of the Scope of the Work.

Before beginning the assessment, the scope of the work should be clearly defined. A workshop and/or meeting may be conducted with the application key stakeholders. In the workshop and/or meeting, a number of topics may be discussed including: an overview of products for cloud migration; an explanation of methodology for cloud enablement (MACH) in regard to the system 10; validating the inventory of applications with the key stakeholders; and determining the inventory of applications to be included in the scope of work (i.e., applications to be migrated to the cloud).

During the workshop and/or meeting, questions may be asked of the key stakeholders. For example, is the scope of work only assessing a single application to be software-as-a-service (SaaS) enabled? Alternatively, is the scope of work assessing migrating an entire set of enterprise applications to the cloud? Other questions for the workshop and/or meeting may include: Is the scope of work evaluating the feasibility of a private cloud or a public cloud for an application(s), a portfolio(s), and/or an enterprise(s), among other questions to be asked of the key stakeholders to define the scope of work.

Creation of the Plan, for the Overall Assessment Exercise.

The creation of the plan may involve delineating (i.e., defining), all of the activities of the assessment that need to be performed, including, but not limited to, milestones and/or dependencies. The plan may also list the key stakeholders (as well as other individuals) that may need to be involved to minimize delays. Additionally, the plan may contain checkpoints to measure the progress of the assessment and/or highlight any issues and/or risks in the process.

A number of activities may be performed using the MACH portal 14. For example, FIG. 7A is an illustration of a customer details screen (i.e., a user interface (UI)), for receiving customer details. The customer details screen enables a customer portfolio to be created and also the capture of other details about the customer line-of-business (LOB).

FIG. 7B is an illustration of a key stakeholders information screen (i.e., display, UI), that enables the identification and documentation of key stakeholders and/or SMEs to be captured using the MACH portal 14.

FIG. 7C is an illustration of an assessment objective capture screen (i.e., display, UI), that enables the identification and/or documentation of the enterprise, such as, but not limited to, enterprise strategy objectives and/or future needs. In order to define and/or document the list of application(s) to be included in the scope of work (i.e., applications to be migrated to the cloud), input from the key stakeholders and/or SMEs may be needed with regard to any business and/or legal implications of moving the application(s) to the cloud. The plan suggests the deliverables (i.e., application(s) to be migrated), based upon the enterprise strategy and/or the future needs identified by the MACH portal 14. A list (i.e., inventory), may be provided for the confirmation by the key stakeholders and/or SMEs and review so that the key stakeholders and/or the SMEs are aware of the expectation of the assessment and the output (i.e., result), in order to avoid ambiguities. The process of identifying the deliverables is automated by the MACH portal 14, but is based upon the requirements of the enterprise, which may be adjusted (i.e., deliverables added or subtracted).

As illustrated in FIG. 7D, the MACH portal 14 may provide a screen to capture the scope of the assessment and also display the applicable deliverables that apply for the selected scope of work. Communication with the key stakeholders can finalize the deliverables and preserve (i.e., save), the assessment details in the MACH portal 14.

Additionally, a workshop and/or meeting may be conducted after closing (finalizing) the scope of work and the planning phase to confirm the list of deliverables that the key stakeholders will receive from performance of the methods of the system 10. This workshop and/or meeting can insure that the key stakeholders understand the expectations of MACH and the output of MACH to avoid ambiguities.

Key Considerations.

There are some key considerations that may be addressed during the planning phase, including:

The consideration of the end goal of the assessment in terms of the expectations of the key stakeholders (as well as the SMEs). Is the goal of the assessment to create, using the system 10, a plan and roadmap for migration of application(s) to the cloud? Alternatively, is the goal of the assessment to determine the feasibility of whether a cloud migration is an option for the application(s)?

The identification of people (e.g., key stakeholders), and/or resources (e.g., computers) that may be needed for the assessment. For example, the SMEs may need to be identified, with various areas of expertise (e.g., technology, domain). A delivery manager may also need to be identified. The key stakeholders may identify the people that can support the system 10 during the definition of objectives and the subsequent analysis of the application(s). Additionally, it may be beneficial to document the availability of resources with regard to the assessment schedule timelines. If there are unavailable resources, those resources may be included in the assessment as a constraint.

The definition of checkpoints for each phase of the overall assessment, as well as the duration of each phase, and the key stakeholders that may be required for each checkpoint and/or the outcome of each checkpoint.

The definition of key stakeholders that may approve (i.e., sign off on), the deliverables provided by the system 10.

The evaluation of whether a proof-of-concept (POC) is necessary in order to validate (i.e., benchmark), any suggestions and/or concepts as provided by the system 10. Additionally, the addition of necessary activities in the planning phase, as well as the selection of the POC application(s) and/or the measurement data.

Deliverables.

The deliverables during the planning phase include: a) the scope in respect of the performance of MACH; b) a MACH plan; and c) a MACH report template. The MACH scope lists the end objective of the assessment, including the application(s) that need to be assessed for migration to the cloud and/or the type(s) of recommendations that the system 10 provides. The MACH plan includes the timelines, milestones, and/or the activities that may be involved with the required resources for each of the activities identified for each of the applications in the scope of work. The MACH report template may include the deliverables at the end of the assessment. It should be noted that the scope of work and the plan of this phase may require a change in the statement of work (SOW) for the assessment, dependent upon any change in the scope of work and/or deliverables from the original SOW.

Assessment Phase.

The next phase of in the performance of MACH (using the system 10) is the assessment phase. The assessment process includes developing an understanding of the landscape of the enterprise and the requirements for migration to the cloud. Additionally, the assessment phase defines the goals and/or objectives for adopting cloud migration. The assessment phase includes examining the landscape of the application(s) from a technical stack (i.e., utilizing software to examine the infrastructure of the enterprise), as well as examining the enterprise domain model and its functionality requirements. The assessment phase also includes application usage, application statistics, and/or trends. All of this information may be consolidated into a set of objectives for cloud migration. During the assessment phase, both enterprise and technical objectives may be documented based on workshops and/or meetings with the key stakeholders. These enterprise and technical objectives may be used throughout the other phases of the MACH process.

A pre-requisite for the start of the assessment phase is that the key stakeholders review and approve the planning phase and scope of work generated by the system 10.

The assessment phase of the MACH process includes the following activities:

A) Understanding the Enterprise from a High Level and the Technical Drivers (i.e., Reasons) for Migration to the Cloud.

This understanding includes an examination of current issues of the enterprise, including the agility as well as efficiency requirements of the enterprise. Additionally, an understanding of the current goals of the enterprise for one or move lines of business (LOBs) also play a part in the understanding of the enterprise. This information may be captured (i.e., recorded), via the MACH portal 14.

B) Evaluating the Existing Enterprise Landscape, Strategy, and Future Needs.

In order to determine a cloud migration strategy with minimal disruptions for the enterprise, an assessment of the existing enterprise landscape, both from a technical architecture point of view and an infrastructure and systems point of view may be required. The assessment of the existing enterprise landscape may require an inventory of the existing enterprise infrastructure, application(s) runtimes, and/or application(s). The system 10 includes a tool called iDiscover tool 12 to obtain the inventory (as shown in FIGS. 1, 2). The iDiscover tool 12 includes an iDiscover agent 22 installed on each server within the existing enterprise data center (i.e., client environment) 18. The iDiscover tool 12 captures enterprise server and enterprise network configurations as well as details about enterprise applications and databases. The enterprise server and enterprise network configuration information and enterprise application and database details are stored in the MACH assessment database 36 to be used in the analysis phase (described in detail below).

The iDiscover tool 12 includes two components: iDiscover agent 22 and iDiscover service 24 (discussed above). The iDiscover agent 22 is configured to run in the enterprise environment 18. The iDiscover agent 22 is configured to run script(s) 34, which include operating system (OS) related application program interface (API) calls and/or software-related API calls. In embodiments, the iDiscover agent 22 is configured to execute (i.e., run), under administrative privileges. The OS-related scripts 34 may capture OS- and system-related information such as, but not limited to, the OS name and/or its version, memory (RAM) information, central processing unit (CPU) information, open network port information, hard disk drive information, etc. Application and/or software-related scripts 34 of the iDiscover agent 22 may be configured to capture application- and/or database-related information. The iDiscover agent 22 may examine the enterprise application server(s) to determine the number of applications installed on a particular enterprise server. The iDiscover agent 22 may also examine the enterprise database server(s) to determine how many databases may reside (i.e., be present), on each enterprise database server and may determine the size of each database present on each enterprise database server. Additionally, network-related information may be entered via the MACH portal 14.

The overall enterprise strategy of the portfolio, and/or the future needs of the enterprise may also provide additional information into the evolution of portfolio applications. This additional information may be captured via the MACH portal 14.

C) Understanding the Current Enterprise Application Usage, Context, and Trends.

The current enterprise application usage information, as well as information detailing the current enterprise's operational issues, resolutions, and workarounds may all be used by the system 10 to define the appropriate cloud objectives (i.e., goals), that the system 10 may utilize to resolve the current enterprise's operational issues. For example, an application may have a large amount of downtime. The system 10 may use this information to include a higher resource availability objective for that application in cloud migration, separate from cost and/or performance objectives. In other words, the system 10 may prioritize a higher resource availability objective for that application while making cost and/or performance objectives secondary. The current enterprise application usage information, as well as information detailing the current enterprise's operational issues, resolutions, and workarounds may be captured (i.e., documented), via the MACH portal 14 in the following format.

D) Documenting the Objectives and Non-Functional Requirements (NFRs) in the Enterprise Application(s).

The documenting involves capturing the following information with respect to each enterprise application under review (i.e., assessment): current enterprise operational issues—examining the agility and efficiency requirements that are desired for the enterprise; current enterprise application usage, context, and trends; downtime, disaster recovery, higher availability, and performance objectives; and security- and compliance-related requirements.

E) Defining Objectives for Cloud Migration.

All of the data obtained by the system 10 may be analyzed to determine a set of objectives for enterprise cloud migration. The objectives for enterprise cloud migration may indicate reasons for the enterprise to migrate to the cloud. The objectives for enterprise cloud migration may also be used by the system 10 to determine key success criteria (KSC) in future phases of the MACH process. The KSC may be used by the system 10 to analyze the objectives for enterprise cloud migration and determine the effectiveness (i.e., appropriateness), of enterprise cloud migration. The MACH portal 14 may provide a scoring system based on data and information captured by the system 10 to predict enterprise objectives. The scoring system and the system 10 prediction may be used by assessors (i.e., key stakeholders), to validate and/or further refine the precise, relevant enterprise objectives, if desired.

FIGS. 8A-8C illustrate MACH portal 14 application inventory screens (i.e., display, UIs), that assessors may use to validate the data captured by the MACH iDiscover tool 12. The MACH portal 14 application inventory screen displays, when the "App Inventory" button is selected, an inventory of applications that have been captured by the iDiscover tool 12. The applications are displayed in the MACH portal 14 screen by name, as well as by type and description (the basic information of each application). A "Detail" button may be provided for each application displayed. If the "Detail" button is selected, MACH portal 14 displays expanded application details for the selected application. In the event that an application is displayed in the inventory but the application is not within the scope of the assessment of the system 10, a selection of the application via the provided check box and clicking the "Delete" button will remove the outside-the-scope application. Conversely, if an application is missing from the displayed inventory, when the "Add" button is clicked, a new display window will appear, allowing for a missing application to be selected from available locations.

FIGS. 8D-8E illustrate MACH portal 14 server information screens. The iDiscover tool 12 may also capture enterprise server and/or network details. The enterprise server and/or network details may be displayed via the MACH portal 14 server information screen in the MACH portal 14, where the enterprise server and/or network details may be modified via the "Add" and "Delete" buttons as described above. The enterprise server and/or network details may be displayed by MACH portal 14 as a result of a number of factors, including an questionnaire regarding the enterprise, architecture, and infrastructure areas. The enterprise server and/or network details captured by the system 10 document various features, aspects, and tenets of enterprise application functionality and enterprise technicalities. The answers to the questionnaire are then consolidated and deliberated on by the system 10 to produce a list of objectives for cloud migration. Each of these objectives may then be discussed with the key stakeholders and further filtered by the system 10 to reach a list of final cloud objectives.

Figure 9:
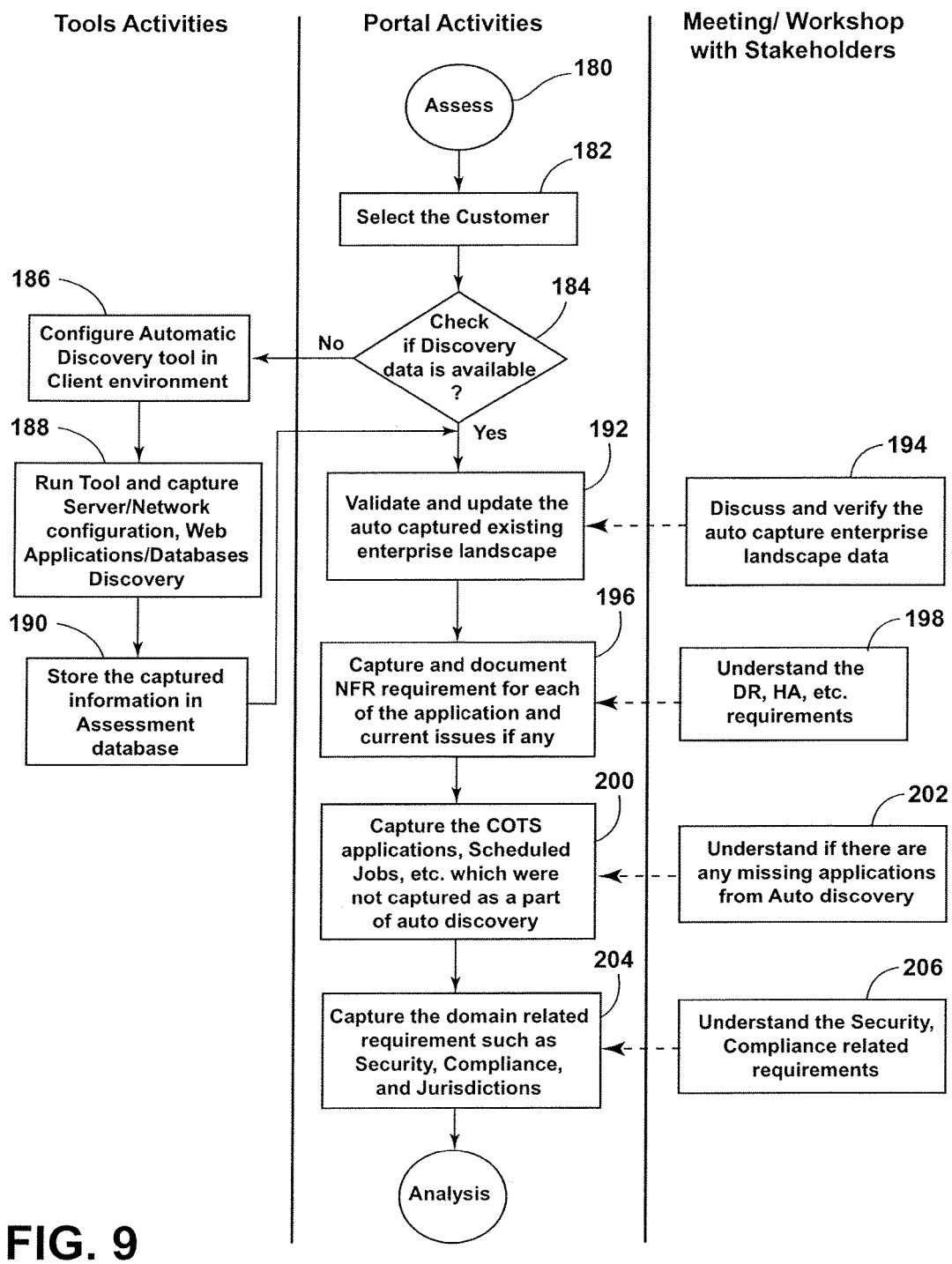
FIG. 9 is a flow diagram generally illustrating an embodiment of an assessment phase of a MACH in accordance with teachings of the present disclosure.

FIG. 9 illustrates a flowchart depicting the flow of activities in the assessment phase of the system 10. The assessment phase of the system 10 includes three types of activities. The first involves the use of tools in the system 10, the second involves the use of the MACH portal 14, and the third involves meetings and/or workshops with key stakeholders.

The first step in the assessment phase is a MACH portal 14 activity, step 180, launching the assessment phase via MACH portal 14. The next step in the assessment phase is also a MACH portal 14 activity, step 182, selecting the customer (i.e., enterprise), via MACH portal 14. The next step is to check if discovery (i.e., enterprise landscape), data of the enterprise is available in step 184.

If no enterprise discover data is available (i.e., present), the assessment phase moves to the next step 186, the configuration of the automatic iDiscover tool 12 in the enterprise (i.e., client), environment 18. The iDiscover tool 12 may be configured (installed) on each server within the enterprise data center in the enterprise environment 18. The next step in the assessment phase if no enterprise discover data is available is step 188, running the iDiscover tool 12 on the enterprise server(s) and capturing server and/or network configuration information, as well as capturing web application(s) and database(s) discovery. The next step in the assessment phase, if no enterprise discover data is available, is step 190 storing the captured (i.e., discovered), information about the enterprise environment 18 in the assessment database.

If the enterprise discovery data is available or once enterprise discovery data is obtained via assessment steps 186-190, the next step in the assessment phase is 192, the validation and revision of the captured discover data of the existing enterprise landscape. This may include step 194, a meeting and/or workshop with key stakeholders to discuss and/or review the captured discover data of the existing enterprise landscape.

The next step in the assessment phase is step 196, the capture and/or documentation of any non-functional requirement(s) (NFRs) for each of the enterprise application(s) and/or current issues (i.e., attributes) with each application(s), if any. This may include step 198, a meeting and/or workshop with key stakeholders to understand any disaster recovery (DR) and/or high availability (HA) requirements, for example.

The next step in the assessment phase is step 200, the capture of any commercial-off-the-shelf (COTS) application(s) and/or scheduled jobs that were not discovered by the iDiscover tool 12. This may include step 202, a meeting and/or workshop with key stakeholders to understand if there are any missing applications that were not discovered by the iDiscover tool 12, based on their knowledge of the enterprise, for example.

The next step in the assessment phase is step 204, the capture of domain-related requirements such as, but not limited to, security requirements, compliance requirements, and/or jurisdictional requirements. This may include step 206, a meeting and/or workshop with key stakeholders to understand the security requirements, compliance requirements, and/or jurisdictional requirements. The information collected in the assessment phase is used in the analysis phase and described in further detail below.

Key Considerations.

One of the key considerations to be addressed during the assessment phase is the need for an accurate assessment questionnaire. In order for the system 10 to provide an accurate assessment, the answers to the assessment questionnaire should be as realistic and as accurate as possible. Another key consideration to be addressed during the assessment phase is the use of overly descriptive language, such as adjectives, in answers to the assessment questionnaire. For example, adjectives such as very large, huge, etc. should be avoided, while quantifiable numbers are recommended. Another key consideration to be addressed during the assessment questionnaire is the identification of the key objectives from each business, information system, and technical infrastructure areas and compare them to each other to define the key objectives. The application space may be separated into a majority of the applications and a remaining or minority set of the applications, and for this, another key consideration to be addressed during the assessment questionnaire is an examination of minority enterprise applications and consulting with the key stakeholders to determine if a separate set of objectives for the minority enterprise applications is warranted, even though the MACH objectives will be directed toward the majority enterprise applications and their requirements for cloud migration.

Deliverables.

The deliverables during the assessment phase include a domain assessment questionnaire, a technical assessment questionnaire, and an objectives document. The domain assessment questionnaire includes the list of questions concerning the enterprise portfolio, such as market agility, information distribution and information security, the enterprise's future roadmap, the enterprise's application life cycle, etc. The technical assessment questionnaire includes the list of questions concerning the technical landscape of the enterprise, such as the enterprise infrastructure and the enterprise platform distribution, access controls, cross-cutting technical functions, configuration management, etc. The objectives document includes a list of objectives which may provide the drivers (i.e., reasons), for cloud adoption. Each objective may be listed with an explanation of the necessity of the objective for the enterprise. The objective documents may be obtained (i.e., downloaded), from MACH portal 14 after the assessor's findings have been submitted to the system 10.

Analyze Phase.

The next phase of the MACH process involving the system 10 is the analyze phase. The analyze phase includes activities to evaluate the answers to the questionnaire and application of the CRISP framework to determine a quantifiable score for defining the public, private, and hybrid propensity (i.e., tendency), of the enterprise applications falling into each of the three categories. The CRISP score for each of the public, private, and hybrid propensity may be selected. At least some of the CRISP score is derived from the application data collected by iDiscover agent 22 and data received via MACH portal 14, including information collected via the questionnaire and/or workshop(s).

For example, global access requires the second set of data (data received via MACH portal 14) for a determination of the percentage (i.e., ratio), of internal facing applications and the number of external facing interfaces along with global access are required. If the percentage of internal facing applications is high relative to external facing applications, then the CRISP private cloud score will be high (e.g., greater than or equal to 4 out of a maximum of 5), and the CRISP public cloud score will be low (e.g., less than or equal to 2 out of a minimum of zero). Conversely, if the percentage of external facing applications is high relative to internal facing applications, then the CRISP public cloud score will be high (e.g., greater than or equal to 4 out of a maximum of 5), and the CRISP private cloud score will be low (e.g., less than or equal to 2 out of a minimum of zero). In the event that the CRISP private and public cloud scores are roughly equal (e.g., approximately between 2 and 4), then the CRISP hybrid cloud score would be higher than either the CRISP private or CRISP public cloud scores, indicating that the cloud migration would tend to a hybrid cloud migration.

A key determining factor on which CRISP score will be higher (of private, public, or hybrid CRISP scores) is dependent on the applicability of the cloud for enabling global access which is determined at least by the number of applications requiring global access, among other factors. The iDiscover service 24 is based on an analytical engine and is preconfigured to determine CRISP scores based on the inputs received, including via application data collected by iDiscover agent 22 and data received via MACH portal 14, including information collected via the questionnaire and/or workshop(s).

Next, one or more cloud architectures are prepared by the system 10 to establish a blueprint (i.e., structure), of the enterprises' cloud and cloud applications identified for realization of the system 10 prepared cloud architectures. For the one or more cloud architectures, an application reference architecture is also prepared by the system 10 to model (i.e., demonstrate), how the applications may appear and operate on the target enterprise cloud platform. Next, all of the identified enterprise applications may then be migrated to the application reference architecture for an efficient and factory-oriented enterprise cloud migration. The analyze phase may also include any proof-of-concepts (POCs) that may be needed or desired by the enterprise to benchmark or validate any concept, design, or method, as well as evaluate the benefits of a particular proposed cloud architecture and/or component.

Pre-requisites for the analyze phase include: all questions to the technical and business questionnaire should be answered and the objectives for cloud adoption should have been identified and agreed upon by the enterprise key stakeholders.

Figure 10:
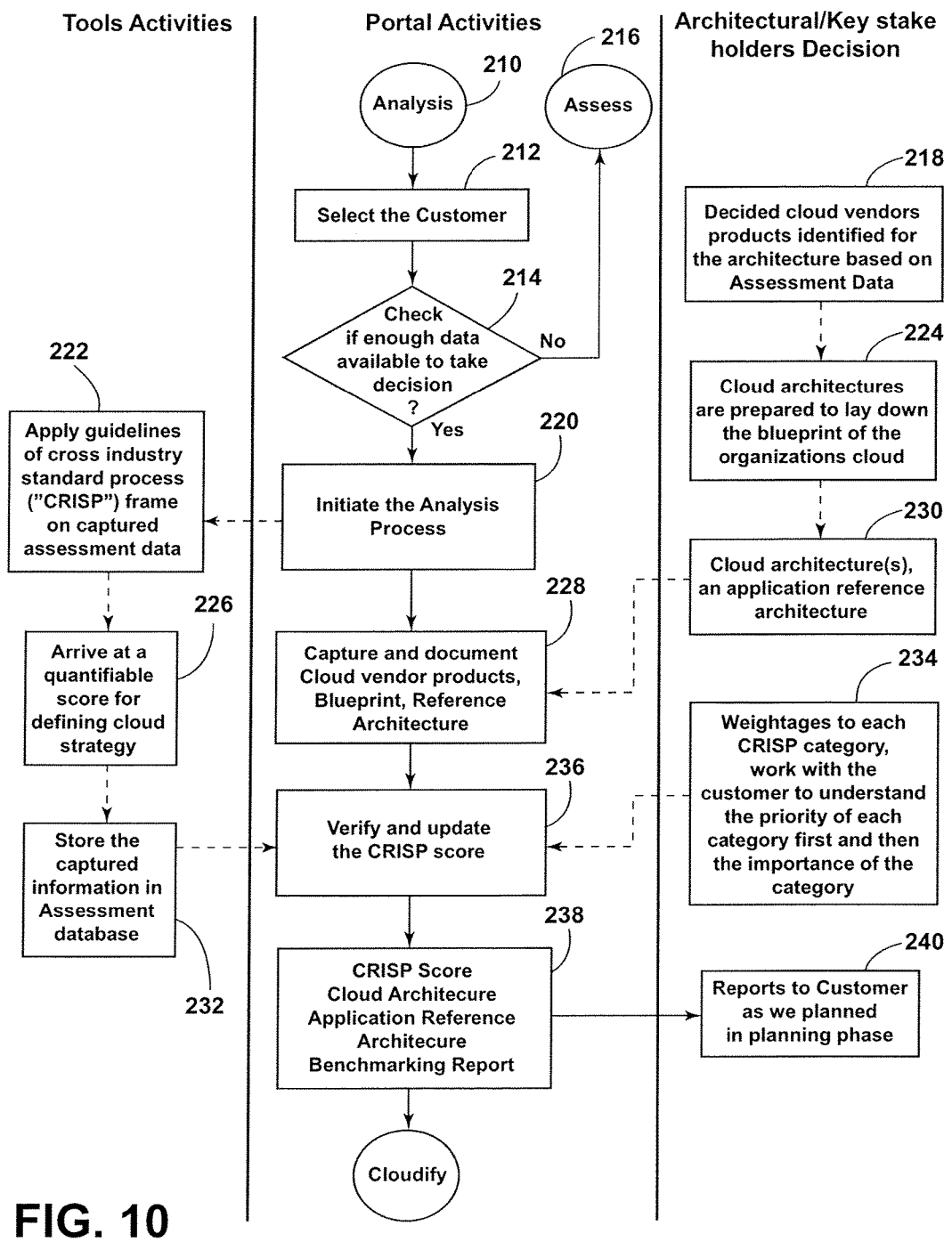
FIG. 10 is a flow diagram generally illustrating an embodiment of an analyze phase of MACH in accordance with teachings of the present disclosure.

FIG. 10 illustrates a flowchart depicting the flow of activities in the analyze phase of the MACH process using the system 10. The analyze phase of the MACH process involving system 10 includes three types of activities. The first involves the use of tool in the system 10, the second involves the use of the MACH portal 14, and the third involves architectural/key stakeholder decisions.

The first step in the analyze phase is a MACH portal 14 activity, step 210, launching the analyze phase via the MACH portal 14. The next step in the analyze phase is also a MACH portal activity, step 212, selecting the customer (i.e., enterprise), via the MACH portal 14. The next step is to check if enough data is available from the assessment phase to make a decision in step 214. If there is a determination that insufficient data is available to make a decision, the process returns to the assessment phase for the MACH process involving the system 10 to capture more data/information about the enterprise in step 216. A concurrent step is an architectural/key stakeholder decision activity, step 218, wherein architectural/key stakeholders identify cloud applications based on the MACH assessment data. If there is enough data available for make a decision, the analyze phase proceeds to step 220.

The next step in the analyze phase is a MACH portal 14 activity, step 220, initiating the analysis process, once the determination has been made that there is enough data available for a cloud migration decision. In step 222, a MACH tool activity, uses tools in the system 10 to apply guidelines of a CRISP frame on the system 10 captured assessment data. Concurrently, step 224, the architectural/key stakeholders prepare cloud architectures to define the blueprint of the enterprise cloud.

The next step in the analyze phase is a MACH tool activity, step 226, using CRISP to arrive at a quantifiable score to define the enterprise cloud strategy. Concurrently, step 228, is a MACH portal 14 activity, wherein the system 10 captures and documents cloud applications, cloud blueprints, and reference architecture. In step 230, architectural/key stakeholders decide on enterprise cloud architecture(s) and an application reference architecture.

The next step in the analyze phase is a MACH tool activity, step 232, using the system 10 to store the captured documents relating to cloud applications, cloud blueprints, and reference architecture in the MACH assessment database 36. In step 234, architectural/key stakeholders decide (i.e., assign), weightages to each CRISP category, as well as develop an understanding of the priority of each category and the importance of each category. For example, is cost the first priority, or is speed the first priority? The information from steps 232 and 234 is provided to the MACH portal 14 in step 236, and the system 10 verifies and/or updates the CRISP score.

The next step in the analyze phase is a MACH portal 14 activity, step 238, the generation of the CRISP score, cloud architecture, application reference architecture, and the benchmarking report. In step 240, the generated data is provided to the architectural/key stakeholders for evaluation and review. After the generation of the CRISP score, cloud architecture, application reference architecture, and the benchmarking report, the analyze phase is complete, the next phase is the cloudify phase, which will be discussed in detail below.

The analyze phase of the MACH process involving the system 10 includes several activities, including applying guidelines to arrive at a CRISP score for cloud topology (public/private). The application of guidelines involves analyzing the responses to the questionnaire (detailed above) together with a set of predefined categories in the CRISP scoring sheet (as shown in FIG. 13). The application of guidelines also involves providing a CRISP score based on the guidelines provided in the CRISP scoring sheet. The application of guidelines further includes assigning weightages to the CRISP categories based on the objectives defined during the previous phase of the MACH process involving the system 10. CRISP scores may be provided for the three topologies: public, private, and hybrid.

Additionally, there is a parallel CRISP scoring process of the system 10 for infrastructure-as-a-service (IaaS) that is generated within the MACH portal 14 when assessing the enterprise architect-initiated CRISP calculation process. The CRISP scoring engines use the information captured earlier by the system 10. The CRISP scores generated by MACH portal 14 may be overridden by the enterprise architect and those overridden CRISP scores may be submitted by the architect to finalize the CRISP scores via the system 10. The system 10 may validate the manual (architect) process and may assist the architect to ensure that the appropriate factors have been considered in the architect's CRISP category selections.

Figure 11:
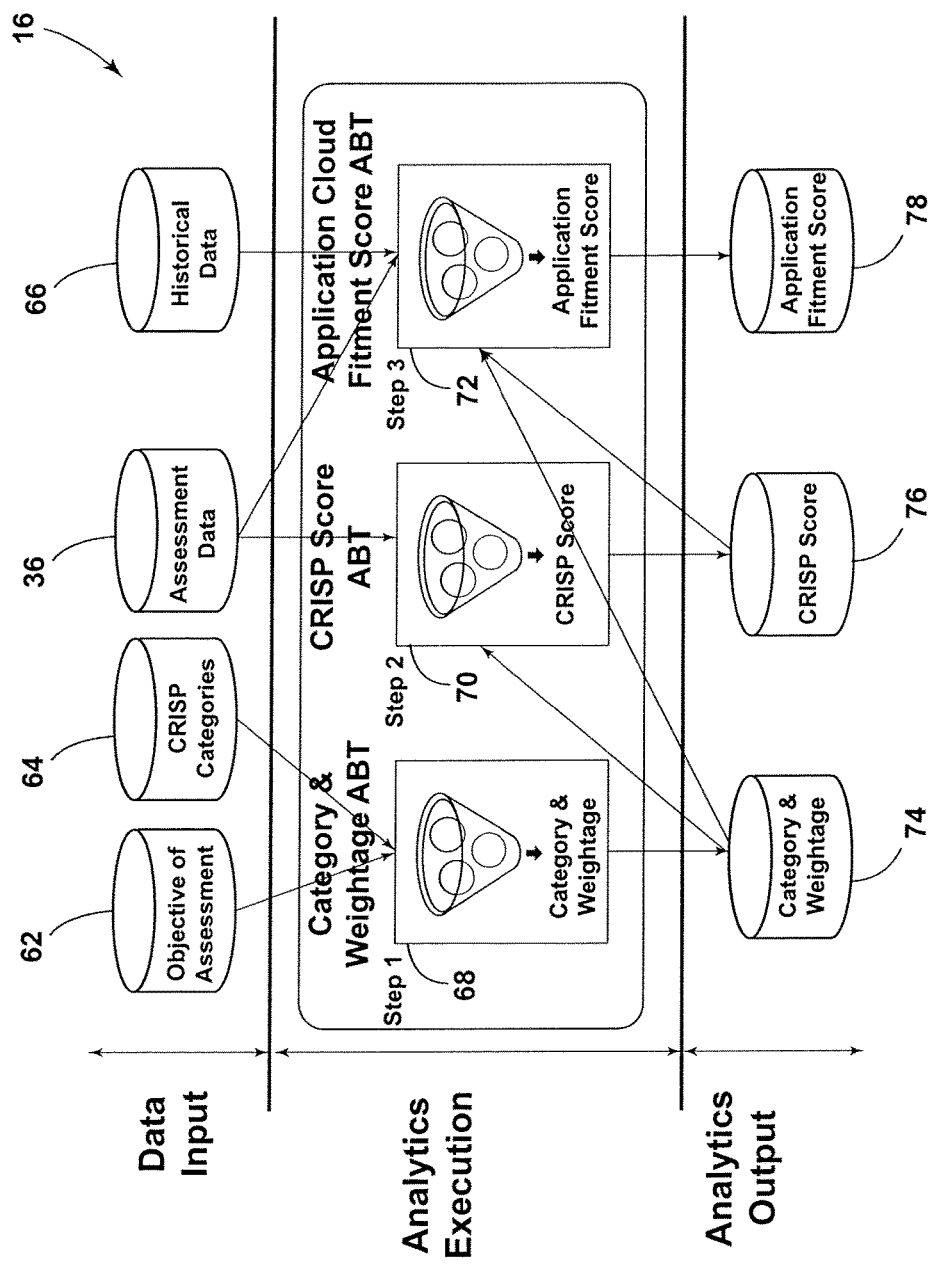
FIG. 11 is a block diagram generally illustrating an embodiment of a MACH scoring engine in accordance with teachings of the present disclosure.

FIGS. 1 and 11 illustrate MACH scoring engine 16 that includes analytics. Analytics are used in the MACH scoring engine 16 in order to determine applicable CRISP categories based at least upon the assessment objectives using the system 10, a CRISP score, and an application fitment score (AFS).

Initially, the MACH scoring engine 16 generates a category and weightage analytical base table (ABT) 68 using captured information such as MACH assessment objectives and CRISP categories (i.e., this is shown as "Step 1" in the Analytics Execution portion of FIG. 11). The MACH scoring engine 16 filters out the applicable CRISP categories based on the MACH assessment objectives, retaining only those CRISP categories which are applicable for the MACH assessment. Additionally, the MACH scoring engine 16 assigns weightages to each CRISP category based on the MACH assessment objectives and/or other considerations. Weightages generated by the MACH scoring engine 16 may be overridden by the architect/key stakeholders, and the architect/key stakeholders may submit the revised weightages to the MACH scoring engine 16 to be finalized. The output from step 1 may include CRISP category and weightage determinations to be used in step 2.

Next, the MACH scoring engine 16 generates a CRISP score ABT 70 using captured information such as MACH assessment data (i.e., this is shown as "Step 2" in the Analytics Execution portion of FIG. 11). The MACH analytics scoring engine 16 determines the CRISP score for a public cloud, a private cloud, and a hybrid cloud using the category and weightage output from Step 1. Additionally, if a MACH assessment objective includes migration to a platform-as-a-service (PaaS) environment, CRISP scoring for PaaS may also be determined. The output from Step 2 may include a CRISP score for cloud topology (e.g., public/private/hybrid), and a CRISP score for PaaS cloud implementation to be used in Step 3. In the event that a large percentage of applications to be migrated are COTS applications, the CRISP PaaS score would tend to be a lower score as a result of lower applicability for cloud migration due to the challenges for migrating COTS applications. COTS applications may be better suited for an IaaS environment.

Next, the MACH scoring engine 16 generates an application cloud fitment score ABT 72 using MACH assessment data and enterprise historical data (i.e., this is shown as "Step 3" in the Analytics Execution portion of FIG. 11). The MACH scoring engine 16 determines an application (cloud) fitment score (AFS) using category and weightage output from step 1 and the CRISP (public/private/hybrid) score from Step 2, which includes assessment data collected by iDiscover agent 22. The output from Step 3 is an application (cloud) fitment score.

The analyze phase of the MACH process involving system 10 includes another activity, the evaluation and analysis of questionnaire responses received by iDiscover service 24 to determine the CRISP score for PaaS cloud migration. The evaluation and analysis of questionnaire responses involves comparing the response against a set of predefined CRISP categories such as a PaaS cloud migration scoring sheet. The comparison may result in a CRISP PaaS score based on the CRISP PaaS guidelines. Weightages may then be assigned to the CRISP PaaS categories based on the MACH objectives defined earlier.

Additionally, there may be a parallel MACH CRISP PaaS scoring process (as shown in FIG. 14) via the MACH portal 14. If an architect/key stakeholder initiates the CRISP determination process, the MACH scoring engine 16 uses the information captured in the previous phases of MACH process by iDiscover agent 22 and/or iDiscover service 24. CRISP PaaS scores generated via the MACH portal 14 may be overridden by the architect/key stakeholders. The architect/key stakeholders may submit new information and the system 10 may finalize the CRISP PaaS score(s) accordingly. This parallel MACH CRISP PaaS scoring process may act to validate a manual (i.e., via an architect/key stakeholder) process and/or may assist the architect/key stakeholder to ensure that the appropriate factors for cloud migration have been considered.

The analyze phase of MACH process involving the system 10 includes another activity, defining an appropriate cloud platform to build upon and an appropriate cloud architecture as a conceptual design. The definition includes creating a blueprint of the cloud platform from the MACH reference cloud architecture. The creation of the blueprint includes analysis of whether each component of the platform is required and detailing the functionality of each component, including the degree of automation and/or benefits to the platform. The created blueprint is then uploaded into the MACH portal 14.

Figure 12:
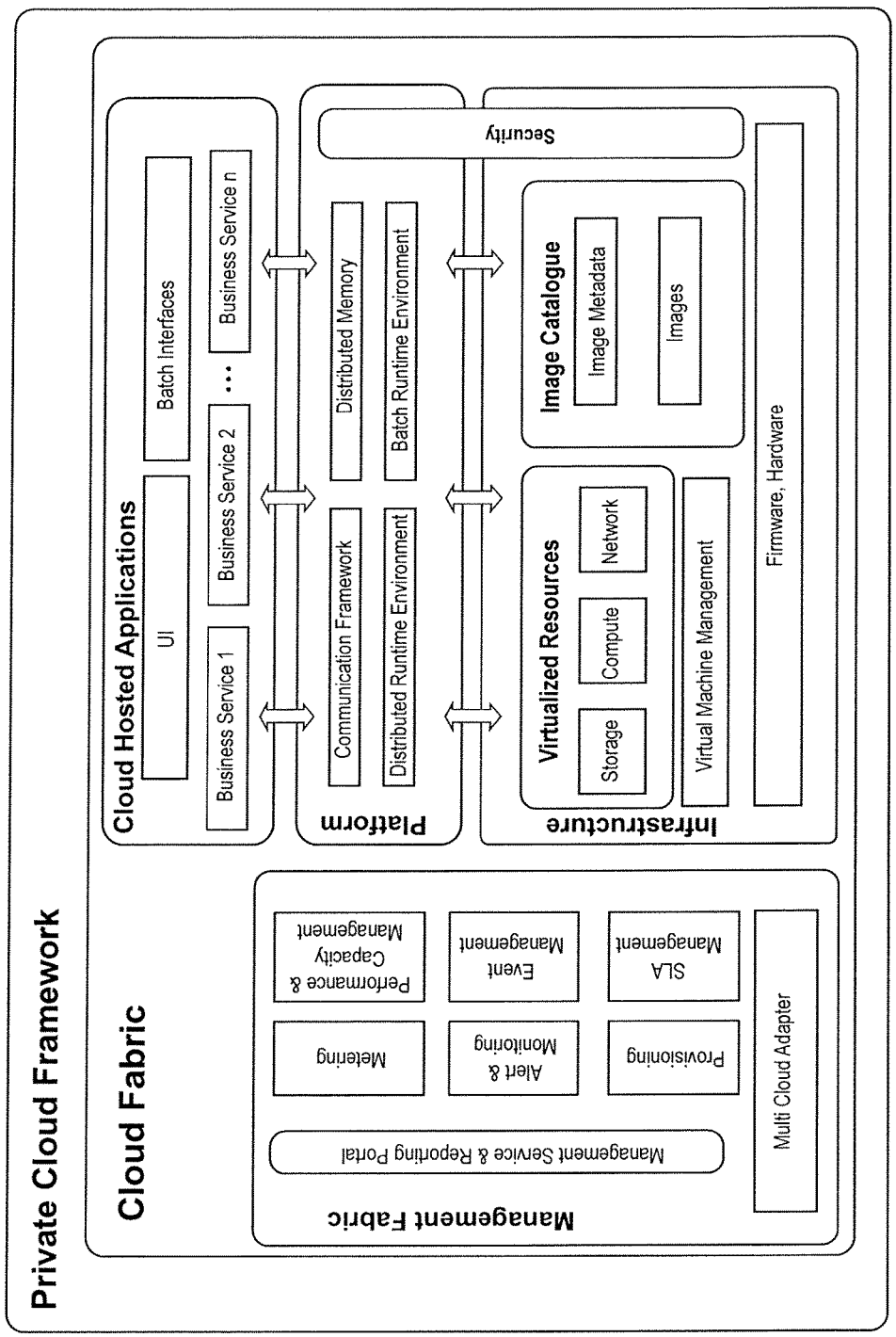
FIG. 12 is a block diagram generally illustrating an embodiment of a MACH private cloud framework in accordance with teachings of the present disclosure.

FIG. 12 illustrates an exemplary private cloud framework architecture. The private cloud framework architecture includes a cloud fabric. The cloud fabric includes several components including a management fabric, cloud hosted applications, a platform, and infrastructure. The management fabric includes a number of modules, including a multi-cloud adapter, a management service and reporting portal, a provisioning module, an alert and monitoring module, a metering module, a SLA management module, an event management module, and a performance and capacity management module. The cloud hosted applications include a user interface (UI) application, a batch interface application, and a number of business service applications (1, 2, . . . n). The platform includes a communication framework, distributed memory, a distributed runtime environment, a batch runtime environment, and a security module that is connected to the infrastructure. The infrastructure includes the security module connected to the platform, as well as a number of virtualized resources including storage, compute, and network resources. The infrastructure includes an image catalogue containing image metadata and images. The infrastructure includes virtual machine management, firmware, and hardware.

The analyze phase of MACH process involving system 10 includes another activity, preparation of reference architecture for applications to be migrated to the cloud. Based on the components defined in the cloud platform, a reference application architecture is developed that is capable of operating on the cloud. Also included are the points of integration and the communication interfaces that are required between the cloud platform and the cloud applications. The reference architecture for applications to be migrated to the cloud may then be uploaded into the MACH portal 14.

Additionally, proof of concept (POC) and benchmarking of the reference architecture may be conducted. In situations where the scope of work includes the development of POCs, it may be necessary to build a test cloud environment (not shown) and deploy an architecturally significant module from the application(s) in the scope of work. In the test cloud environment, functional and non-functional tests of the deployment of the architecturally significant module from the application(s) in the scope of work may be conducted, documented, and benchmarked for all other modules from the application(s) in the scope of work in preparation for their deployment. POC and benchmarking also acts as a pre-validation on the cloud migration initiative by comparing the metrics obtained via the POC to the quantified objectives expected from cloud migration.

Key Considerations.

Some of the key considerations that may be made during the analyze phase are the following.

Analyzing the objectives and categories objectively rather than subjectively, when providing a CRISP score. For example, when analyzing if investments in software (one of number of a CRISP decision categories) are to be reused or not, not considering the security of applications when providing a CRISP score.

Understanding the priority of each category (of the CRISP score) first and then the importance of each category when assigning weightages to each CRISP category.

Assigning a zero weightage to categories that are not applicable to the enterprise will improve the accuracy of the CRISP score and therefore provide a more accurate suggested cloud platform architecture. However, confirm that the total of all of the weightages in the CRISP score sheet equals 100 percent.

Covering the processes of provisioning, scaling up and scaling down, security, and availability in the cloud platform architecture.

Defining the monitoring and management framework by factoring in an alerting mechanism required by the enterprise and/or SLA management, if necessary.

Automating as many processes as possible, to improve the effectiveness of the cloud migration, while considering the required returns on the automation.

Defining and documenting clearly the objectives of the POC. The POC should be used to either validate a new cloud platform architecture or to benchmark an already proven cloud platform architecture. For example, the objective should be clearly defined to test a self-healing script 34 to trigger on threshold values.

Using management tools to collect metrics during a POC evaluation is optional and custom methods could be used as an alternative to the set-up of time-consuming management tools that may not be necessary at the POC stage.

Deliverables. The deliverables during the analyze phase are a CRISP score, a CRISP score for PaaS, cloud architecture, application reference architecture, and the optional POC and benchmarking report.

FIG. 13 illustrates an exemplary CRISP score chart. The CRISP score is a comparative score taken across a number of decision categories for public cloud, private cloud, and hybrid cloud topologies. For each of these cloud topologies, scoring is provided for each of the decision categories and the scores are tabulated based on the relative weightages for each decision category. The final CRISP score indicates whether it is feasible and recommended by the system 10 to adopt a specific cloud topology (e.g., public, private, or hybrid), for the applications or portfolio in the scope of work.

CRISP decision categories, upon which weightage is assigned, include global access, existing investments in infra/software, availability, infrastructure utilization, cart, business trend, data storage security, relational databases, authentication, regulatory compliance, legacy/manual cloud conferment, and man-mission critical.

FIG. 14 illustrates an exemplary CRISP score for PaaS score chart. The CRISP score for PaaS is a comparative score taken across a number of decision categories for PaaS. Scoring is provided for each of the decision categories and the scores are tabulated based on the relative weightages for each decision category. The final CRISP score for PaaS indicates whether it is feasible and recommended by the system 10 to adopt a PaaS type of cloud topology for the applications and/or portfolio in the scope of work.

The application reference architecture (as shown in FIG. 12) provides a reference architecture that each of the applications to be cloud hosted should migrate to in order to realize the maximum benefits of cloud migration. It is possible that there is more than one application reference architecture depending upon the applicable technologies, the cloud, and the current architectural styles being used. If there is more than one application reference architecture, each application reference architecture will be provided by the system 10.

The POC and benchmarking report provides the objective, details and the result of the POC executed during the MACH process involving system 10 to validate concepts or review benchmarks. The POC and benchmarking report is optional.

Cloudify Phase.

The cloudify phase of the MACH process involving system 10 marks the transition from the cloud platform as a whole to the specific applications to be hosted on the cloud. In the cloudify phase, an understanding of each application to be hosted on the cloud is required in order to determine the appropriate migration, as well as defining the migration strategy, and also how to measure the effectiveness of the migrated application on the cloud platform.

The pre-requisites of the cloudify phase are the cloud platform architecture has been created and reviewed and the application reference architecture has been created and reviewed.

Figure 15:
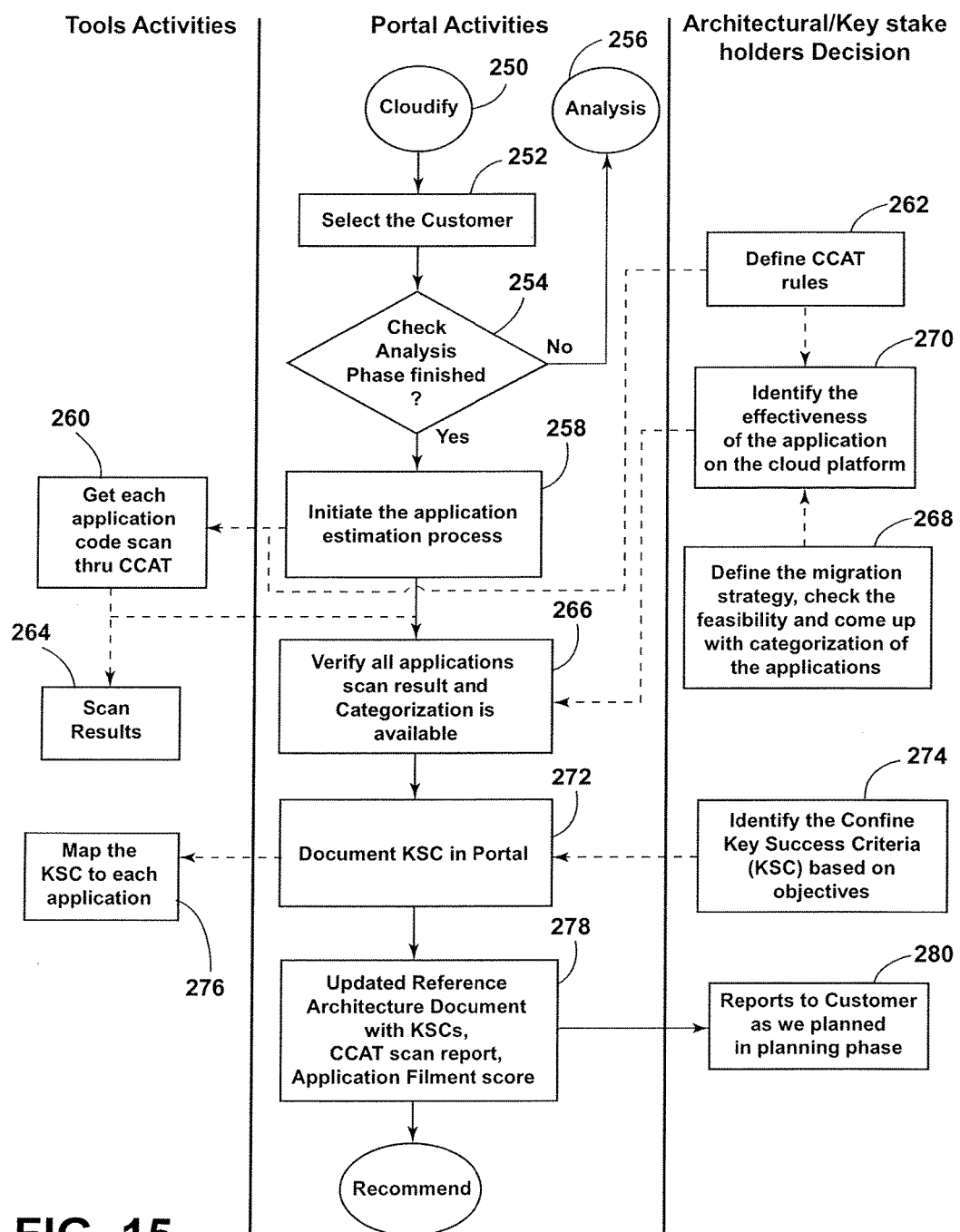
FIG. 15 is a flow diagram generally illustrating an embodiment of a recommend phase of an embodiment of MACH in accordance with teachings of the present disclosure.

FIG. 15 illustrates a flowchart depicting the flow of activities in the cloudify phase of MACH process involving system 10. The cloudify phase includes three types of activities. The first involves the use of MACH tools of the system 10, the second involves the use of the MACH portal 14, and the third involves architectural/key stakeholder decisions.

The first step in the cloudify phase is a MACH portal 14 activity, step 250, launching the cloudify phase via the MACH portal 14. The next step in the cloudify phase is also a MACH portal 14 activity, step 252, selecting the customer (i.e., enterprise), via the MACH portal 14. The next step is to check if the analyze phase is finished in step 254. If there is a determination that the analyze is not finished, the process returns to the analyze phase in step 256. If there is a determination that the analyze is finished, the cloudify phase proceeds to step 258, a MACH portal 14 activity, initiating the application estimation process. In step 260, the CCAT tool 300 (as shown in FIG. 16, described in detail below) is used to get each application code scanned. Concurrently, in step 262, an architectural/key stakeholder decision activity, the architectural/key stakeholders define the rules by which the CCAT tool 300 operates.

In step 264, the results of the CCAT tool 300 are reviewed via the MACH tool 10 in a report in readable format, such as .pdf. In step 266, using the MACH portal 14, verification that all applications have been scanned and a categorization of the scanned applications is available for review via the MACH portal 14. In step 268, the architectural/key stakeholders define the migration strategy, check the feasibility of the strategy, and determine the categorization of the applications. Concurrently, in step 270, architectural/key stakeholders identify the effectiveness of the applications on the cloud platform.

In step 272, the key success criteria (KSC) is documented via the MACH portal 14. In step 274, architectural/key stakeholders identify and define the KSC based on the objectives. In step 276, MACH tool of system 10 maps the KSC to each application.

In step 278, using the system 10, the reference architecture document is updated with the KSC, the CCAT tool 300 scan report, and the application fitment score. In step 280, architectural/key stakeholders receive a report with the KSC, the CCAT tool 300 scan report, and the application fitment score as planned in the planning phase.

FIG. 16 illustrates an embodiment of a CCAT tool 300 architecture of the system 10. The CCAT tool 300 provides effort estimates for each non-conformity within each application for cloud migration. By consolidating the effort estimates of all of the non-conformities of the application for cloud migration, the total migration effort estimate for each application may be realized.

The CCAT tool 300 includes a CCAT administrative portal 302. The CCAT administrative portal 302 requires authentication. In order to avoid unauthorized access of CCAT tool 300, only registered users, such as a CCAT admin 304, may be allowed access to the CCAT tool 300 to execute the CCAT tool 300. Only the CCAT admin 304 may add, modify or delete the authorized users of the CCAT tool 300. Authorized user details are encrypted and send across to an authentication web API 306 for create, update, and delete (CRUD) operation in the CCAT tool 300 user repository database 308.

The CCAT tool 300 includes a CCAT desktop 310. The CCAT desktop 310 includes a user interface (UI) 312. The CCAT desktop 310 includes a Windows® Presentation Foundation (WPF) based user interface 312. A CCAT user 330 may upload project source code 332 (e.g., .cs, .vb, .sql, and .config files), via user interface 312. The CCAT desktop 310 includes a resource module 314 and CCAT rules 316. The CCAT rules 316 are defined in .xml files which may be placed in a profiles folder (not shown). Code is scanned based upon the CCAT rules 316 defined. The CCAT rules 316 may include details such as issue level, issue description, issue resolution, regex (regular expression) based keyword search to find the anomaly, in the case of automatic remediation replacement logic. The CCAT desktop 310 includes a CCAT scanning engine 318 that includes a CCAT scanning engine 320, CCAT utilities 322, and a CCAT remediation engine 324. The CCAT scanning engine 320 scans an application file line-by-line of a complete application file based on CCAT rule(s). All of the anomalies of the application are listed and provided to the CCAT remediation engine 324 if automatic remediation is required or to CCAT reporting services to generate the CCAT report. The CCAT utilities 322 include utility classes that process encryption and decryption logic, and .pdf or .csv generation logic. The CCAT remediation engine 324 identifies the part of the issue string that requires automatic remediation and replaces the part of the issue string with a .xml-based ruleset if automatic remediation is selected.

The CCAT tool 300 includes the generation of CCAT reports 326, 328. The CCAT tool 300 generates reports 326, 328 in .pdf and .csv format, permitting the reports 326, 328 to be easily distributed and viewed, either within the enterprise or outside the enterprise. The .pdf CCAT report 326 summarizes the CCAT tool 300 scan results. The .pdf CCAT report 326 includes a report overview of the CCAT results in tabular format and a graphical overview of the results in a chart format. The .pdf CCAT report 326 includes the total number of files scanned, number of files with issues, number of lines, total number of issues, total lines scanned, and total number of CCAT rules 316 executed by the CCAT tool 300 and a graphical representation of important measures like distribution of issues in terms of simple, medium and high complex related to cloud compliance in chart form. The .csv CCAT report 328 is generated using a OpenXML nugget package. The .csv CCAT report 328 includes the following details. File—displays the full path of the scanned file. Line No.—displays the line number in the scanned file, on which the violation(s) is raised. Category—name of the CCAT rule 316 category. Level—the violation(s) level (e.g., high, medium, or low). Line—the actual application code contents. Issue description—the detailed description of the cause of the violation(s). Rule file—the name of the CCAT rule 316 file. Resolution—the resolution to repair the violation(s). Resolution complexity—the level of complexity of repairing the violation(s). Auto fix status—an indication if the violation(s) has been automatically fixed by the CCAT tool 300. Effort—the effort required to fix the violation(s).

Figure 17:
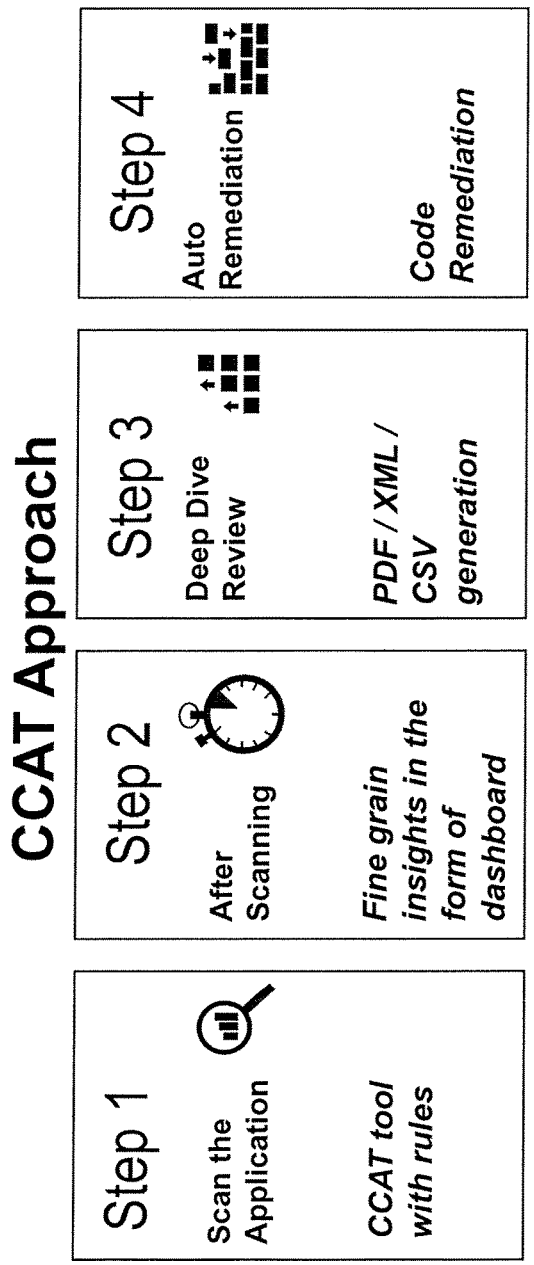
FIG. 17 is a flow diagram generally illustrating an embodiment of a MACH CCAT tool in accordance with teachings of the present disclosure.

FIG. 17 illustrates a high level overview of the operation of the CCAT tool 300. In Step 1 of FIG. 17, the application is scanned by the CCAT tool 300, with one or more CCAT rules applied to the application scan. In Step 2 of FIG. 17, after the CCAT tool 300 scan is complete, details of the application, including any CCAT rule violations, are displayed via the CCAT desktop 310. In Step 3 of FIG. 17, the CCAT tool 300 generates reports 326, 328 in .pdf, .csv, and .xml format to permit a "deep-dive" or thorough review of the application and any CCAT rule violations. In Step 4 of FIG. 17, the CCAT tool 300 automatically remediates (i.e., repairs), the code of the application scanned by the CCAT tool 300.

The cloudify phase of MACH process using the system 10 includes the activities listed below:

The Initiation of a Cloud Migration Estimation Process through the MACH Portion 14.

The definition of categories for the application fitment store (AFS) is dependent upon the reference architecture. Based on the objectives defined for the cloud migration, the cloud platform architecture and the application reference architecture, categories are defined that will be used to assess the application migration feasibility for cloud migration. Starting with the pre-defined categories available in the Syntel AFS categories, review which categories are needed and which categories are not needed (i.e., not applicable). For each needed category, a weightage is provided to determine the category's importance relative to other categories. In the event that the objectives of the reference architectures require another category, a new category with its relative weightage may be added. The totality of categories may be captured via the AFS user interfaces displayed in the MACH portal 14.

The Feasibility Analysis of Migrating Applications to the Cloud (Fitment Store).

Once the categories have been defined, an assessment all of the applications in the scope of work, along with each of the categories, to determine a CRISP score.

The Definition of Rules for the CCAT Tool 300.

Review each of the cloud objectives to define CCAT rules 316 that warrant inspection by the CCAT tool 300. It is possible that each objective may have multiple rules that may be applied throughout the application (i.e., more than once) to discover any non-conformities or other problems.

The Execution of the CCAT Tool 300 on Applications to be Migrated.

Execute the CCAT tool 300 on the applications to be migrated to discover any non-conformities within each application to be migrated. The number of non-conformities together with the complexity of the particular rule and/or the time required to repair (i.e., fix), the non-conformity may be estimated by CCAT tool 300. The output of each application scanned by CCAT tool 300 may be uploaded to the MACH portal 14.

The Identification and Confirmation of the Key Success Criteria (KSC) Based on the Objectives.

For each of the objectives identified and the application reference architectures defined, the KSC may be identified for each application. The KSC may be more quantifiable with respect to the applications as compared to the cloud migration objectives. For example, if a cloud migration objective is to improve the utilization (of the application) by twenty percent, the KSC may be that for each of the physical servers, determining the central processing unit (CPU) utilization may be 55 percent and memory utilization may be 70 percent of the total CPU and memory allocated, respectively. The KSC are used in the eventual migration in situations where examining the metrics (i.e., CRISP score), to determine if the expected realization (of the migration) has happened, or whether further investigation is required. The KSC may be captured in the MACH portal 14 for each application and the updated reference architecture document with the updated KSC may also be uploaded to the MACH portal 14.

Key Considerations.

Key considerations in the cloudify phase include a workshop/meeting with the enterprise key stakeholders may be required at this point to confirm the weightages provided to each of the AFS categories. Another key consideration is the possibility of different application owners within the enterprise considering different priorities as important. An explanation that by comparing the applications, the applications may be compared to each other and scored appropriately. A compromise among the owners may be necessary to determine the appropriate weightage for each of the disputed categories. Another key consideration is documenting the KSC in quantifiable terms, if available. For example, SLA requirements, performance requirements, etc. Another key consideration is identification of the KSC that are specifically handled by the application architecture. Another key consideration is confirmation of timelines for implementation of the cloud migration. The timelines should be included in the KSC to enable a more precise roadmap for migrating applications to the cloud.

Deliverables.

The deliverables in the cloudify phase include an updated reference architecture document with the KSC. The updated reference architecture document specifies the KSC applicable for each application reference architecture. The KSC are mapped to an objective that is defined in the objective document.

Additionally, another deliverable in the cloudify phase is a CCAT execution report (not shown). The CCAT execution report may contain the CCAT rules 316 identified and defined to be executed on the applications in the scope of work. Each CCAT rule 316 indicates what function it performs, the criticality (e.g., blocking, critical, medium, and low), as well as any remediation mechanism, if possible. Each CCAT rule 316, when executed on each application in the scope of work, will result in an execution result and an output that will be listed in the CCAT execution report. Individual CCAT execution reports may be generated, as well as a summary CCAT execution report, for all applications in the scope of work.

Additionally, another deliverable in the cloudify phase is an application fitment score (AFS). The AFS document includes the final application fitment categories and the application fitment weightage relative to each other. Each application in the scope of work is assigned a score, for example, between one and five across the application fitment categories. Each application in the scope of work may have a consolidated application fitment score that may be based on the application fitment score assigned and/or the weightage assigned by the system 10. The applications in the scope of work may also be identified by their priority to indicate an easy or difficult migration for each application in the scope.

Recommend Phase.

The recommend phase is the culmination of the MACH process involving system 10. The recommend phase provides the enterprise with the necessary information on its enterprise application landscape and/or its readiness to migrate to the cloud.

The recommend phase includes pre-requisites such as the cloudify phase and the analyze phase has been completed for all applications in the scope of the work to be migrated to the cloud and the proof-of-concept (POC) has also been completed in the analyze phase, if included in the scope of work (optional).

Figure 18:
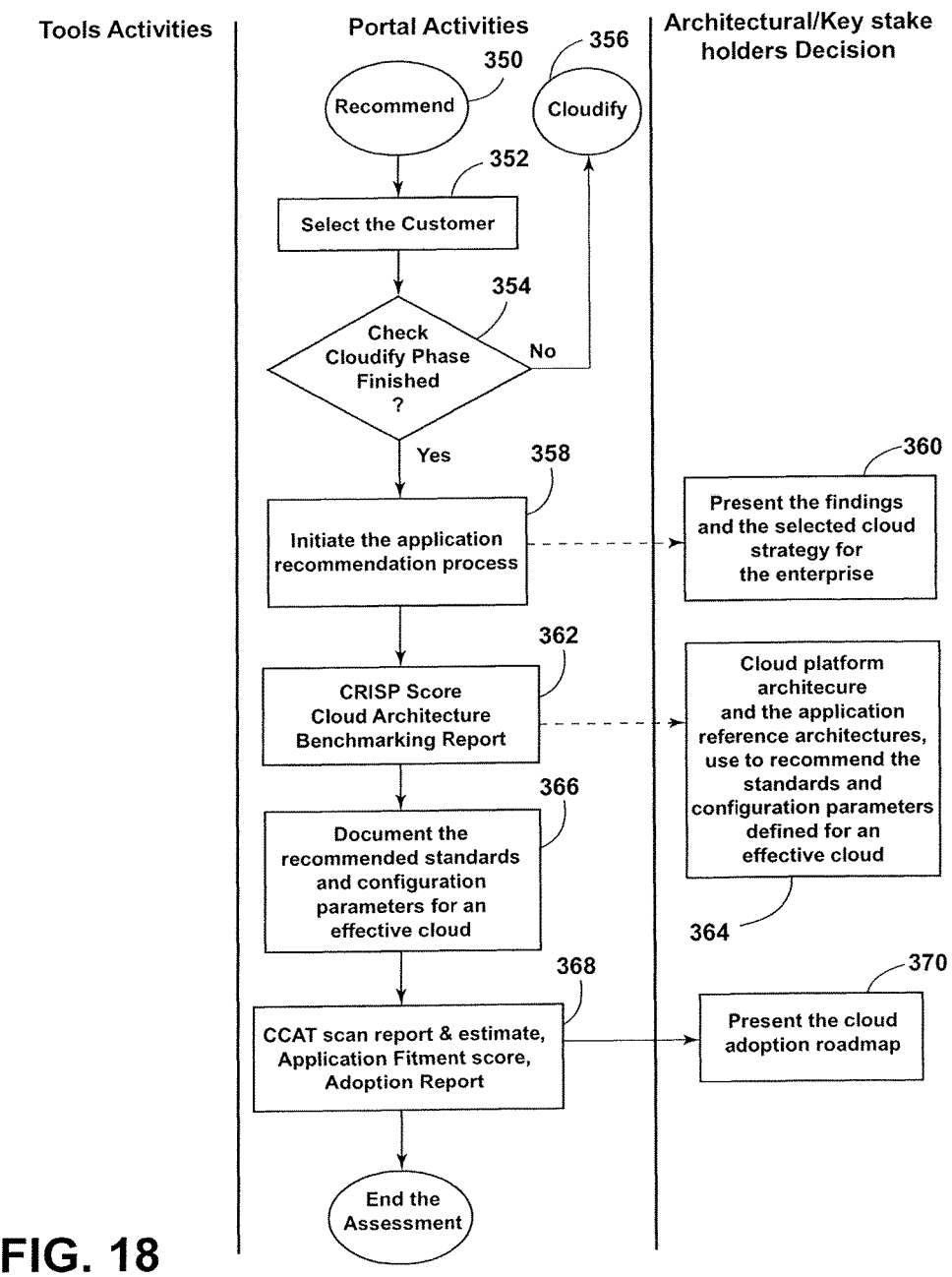
FIG. 18 is a flow diagram generally illustrating an embodiment of a MACH CCAT tool in accordance with teachings of the present disclosure.

FIG. 18 illustrates a flowchart depicting the flow of activities in the recommend phase of MACH process involving system 10. The recommend phase includes three types of activities. The first involves the use of MACH tools of system 10, the second involves the use of the MACH portal 14, and the third involves architectural/key stakeholder decisions.

The first step in the recommend phase is a MACH portal 14 activity, step 350, launching the recommend phase via the MACH portal 14. The next step in the recommend phase is also a MACH portal activity, step 352, selecting the customer (i.e., client, enterprise), via the MACH portal 14. The next step is to check if the cloudify phase is finished in step 354. If there is a determination that the cloudify phase is not finished, the process returns to the cloudify phase in step 356. If there is a determination that the cloudify phase is finished, the recommend phase proceeds to step 358, a MACH portal 14 activity, initiating the application estimation process. In step 360, the architectural/key stakeholder present the findings of the analyze phase and the MACH selected cloud strategy for the enterprise.

In step 362, the MACH portal 14 produces the determined CRISP score, cloud architecture, application reference architecture, and benchmarking report and provides that information to the architectural/key stakeholders in step 364, so that the architectural/key stakeholders may use that information to recommend the standards and configuration parameters for an effective cloud migration.

In step 366, the MACH portal 14 documents (receives from the architectural/key stakeholders) the recommended standards and configuration parameters for an effective cloud migration from previous step 362.

In step 368, the MACH portal 14 processes the CCAT scan report and estimate, along with the application fitment score (AFS) and the migration report. In step 370, the system 10 presents the cloud migration roadmap to the architectural/key stakeholders.

The recommend phase of the MACH process involving the system 10 is summarized by the following activities: An initiation of the cloud migration recommend process via the MACH portal 14. The generation and downloading of all reports related to the MACH assessment based on the selections of the planning phase. The presentation of the recommend findings and the MACH selected cloud strategy for the enterprise, based on the CRISP score, the CRISP for PaaS score, and the assessment questionnaire. The definition of cloud-specific architectural standards and/or configuration parameters for the selected cloud migration. The presentation of the roadmap for migrating the enterprise applications to the cloud, using the application fitment score (AFS) and/or the CCAT report (not shown). The roadmap includes information as to how and when each application in the scope of work is to be migrated to the cloud. In the event the roadmap details a gradual migration to the cloud, information on how the migrated applications will interact with on-premises applications yet to be migrated will be detailed. An effort estimate for cloud migration is provided, using the CCAT report.

Deliverables.

The deliverables in the assessment phase include an adoption report and estimates. The adoption report (not shown) summarizes the MACH assessment approach with detailed findings and recommendations as defined and confirmed in the plan phase by the architectural/key stakeholders. The estimates include effort and cost estimates for cloud migration to the defined cloud platform using Syntel's proven software factory model.

Benefits.

The benefits of employing the MACH assessment process for application migration to the cloud include a clear roadmap for the cloud migration can be realized. A realization of the enterprise goals and/or objectives can be envisaged via the key success criteria (KSC). Any risks involved in cloud migration can be identified in advance via a proof-of-concept. The effort and cost of migrating enterprise applications to the cloud can be determined. The enterprise applications can be standardized by migrating to the cloud via the application reference architectures, reducing cloud complexity.

Various embodiments are described herein to various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments, the scope of which is defined solely by the appended claims.

Reference throughout the specification to "various embodiments," "some embodiments," "one embodiment," or "an embodiment," or the like, means that a particular feature, structure, or characteristic described in connection with the embodiment is included in at least one embodiment. Thus, appearances of the phrases "in various embodiments," "in some embodiments," "in one embodiment," or "in an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment may be combined, in whole or in part, with the features, structures, or characteristics of one or more other embodiments without limitation given that such combination is not illogical or non-functional.

The present disclosure is directed and method and system which can be utilized to evaluate and assess the readiness of enterprise applications for the cloud. This disclosure could be used in a variety of contexts, such as portfolio assessment, topology recommendation, reference architectures, application migration assessment, migration strategy and roadmap, and migration effort estimation.

It should be understood that a system 150, particularly a main electronic control unit (i.e., computing unit 152), as described herein may include conventional processing apparatus known in the art, capable of executing pre-programmed instructions stored in an associated memory, all performing in accordance with the functionality described herein. To the extent that the methods described herein are embodied in software, the resulting software can be stored in an associated memory and can also constitute the means for performing such methods. Implementation of certain embodiments, where done so in software, would require no more than routine application of programming skills by one of ordinary skill in the art, in view of the foregoing enabling description. Such an electronic control unit may further be of the type having both ROM, RAM, a combination of non-volatile and volatile (modifiable) memory so that any software may be stored and yet allow storage and processing of dynamically produced data and/or signals.

It should be further understood that an article of manufacture in accordance with this disclosure includes a computer-readable storage medium having a computer program encoded thereon for implementing the MACH logic and other functionality described herein. The computer program includes code to perform one or more of the methods disclosed herein. Such embodiments may be configured to execute one or more processors, multiple processors that are integrated into a single system or are distributed over and connected together through a communications network, and where the network may be wired or wireless.

Although only certain embodiments have been described above with a certain degree of particularity, those skilled in the art could make numerous alterations to the disclosed embodiments without departing from the scope of this disclosure. All directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of embodiments. Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. Additionally, the terms "electrically connected" and "in communication" are meant to be construed broadly to encompass both wired and wireless connections and communications. It is intended that all matter contained in the above description or shown in the accompanying drawings shall be interpreted as illustrative only and not limiting. Changes in detail or structure may be made without departing from the invention as defined in the appended claims.

Any patent, publication, or other disclosure material, in whole or in part, that is said to be incorporated by reference herein is incorporated herein only to the extent that the incorporated materials does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

While one or more particular embodiments have been shown and described, it will be understood by those of skill in the art that various changes and modifications can be made without departing from the spirit and scope of the present teachings.

What is claimed is:

1. A computer-implemented method for the evaluation of a plurality of subject applications for migration to the cloud, the method comprising the steps of:

executing, on at least one or more computers being used by the subject applications, a cloud migration application discovery tool, wherein the cloud migration application discovery tool is configured by way of a first program to capture application inventory data associated with said plurality of subject applications and to store the captured application inventory data in an assessment database;

analyzing, on a separate computer not used by the subject applications, a plurality of user-defined objectives for application cloud migration obtained via a user interface and filtering a set of predetermined cloud risk probability (CRISP) categories based on the user-defined objectives;

determining, via a scoring engine, on the separate computer, a respective weightage to associate with each category of the set of filtered predetermined CRISP categories for each subject application to be assessed for migration to the cloud;

generating a CRISP score for a respective cloud topology by applying the respective weightage associated with each of the set of filtered predetermined CRISP categories to the application inventory data stored in the assessment database; and determining respective application fitment scores for each subject application associated with the application inventory data based on the generated CRISP score and historical application cloud migration data.

2. The method of claim 1 further comprising defining, on the separate computer, at least one rule for a cloud code analysis tool (CCAT) based on the plurality of user-defined objectives for application cloud migration; and executing, on the separate computer, the CCAT to determine any non-conformities to cloud migration for each subject application based on the at least one rule.

3. The method of claim 2, wherein the executing of the CCAT further includes determining the time required to resolve the non-conformities to cloud migration for each subject application based on the at least one rule.

4. The method of claim 3, wherein the executing of the CCAT further includes correcting the non-conformities to cloud migration for each subject application based on the at least one rule.

5. The method of claim 1, further comprising receiving non-functional requirements for the subject applications based on the application inventory data or any additional applications for cloud migration via the user interface.

6. The method of claim 1, further comprising capturing any commercial-off-the-shelf (COTS) applications not discovered by the first program.

7. The method of claim 6, further comprising storing the captured COTS applications in the assessment database.

8. The method of claim 1, further comprising receiving at least one cloud reference architecture based at least upon the plurality of user-defined objectives for application cloud migration or the set of filtered predetermined CRISP categories.

9. The method of claim 1, further comprising receiving key success criteria (KSC) based at least upon the plurality of user-defined objectives for application cloud migration or the set of filtered predetermined CRISP categories.

10. The method of claim 1, further comprising determining the current operating environment of the subject applications.

* * * * *